US006857045B2

United States Patent
Galbraith et al.

(10) Patent No.: US 6,857,045 B2
(45) Date of Patent: Feb. 15, 2005

(54) METHOD AND SYSTEM FOR UPDATING DATA IN A COMPRESSED READ CACHE

(75) Inventors: Robert Edward Galbraith, Rochester, MN (US); Adrian Cuenin Gerhard, Rochester, MN (US); Brian James King, Rochester, MN (US); William Joseph Maitland, Jr., Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 10/057,647

(22) Filed: Jan. 25, 2002

(65) Prior Publication Data

US 2003/0145172 A1 Jul. 31, 2003

(51) Int. Cl.[7] .............................................. G06F 12/00
(52) U.S. Cl. ...................... 711/118; 711/133; 711/134; 711/136; 711/142; 711/143; 707/100; 707/101
(58) Field of Search ................................ 711/118, 133, 711/159; 707/100, 101

(56) References Cited

U.S. PATENT DOCUMENTS

| 5,481,701 A | * | 1/1996 | Chambers, IV | 707/101 |
| 6,119,120 A | * | 9/2000 | Miller | 707/101 |
| 6,192,450 B1 | | 2/2001 | Bauman et al. | 711/135 |
| 6,240,419 B1 | * | 5/2001 | Franaszek | 707/101 |
| 6,286,080 B1 | | 9/2001 | Galbraith et al. | 711/113 |
| 6,438,556 B1 | * | 8/2002 | Malik et al. | 707/101 |
| 6,484,228 B2 | * | 11/2002 | Breternitz et al. | 711/1 |
| 6,523,102 B1 | * | 2/2003 | Dye et al. | 711/170 |
| 6,539,460 B2 | * | 3/2003 | Castelli et al. | 711/154 |

* cited by examiner

Primary Examiner—Donald Sparks
Assistant Examiner—Ngoc V Dinh
(74) Attorney, Agent, or Firm—Dugan & Dugan

(57) ABSTRACT

In a first aspect, a method is provided for updating a compressed cache. The method includes the steps of (1) initiating an update routine for replacing first data stored within the cache with second data, wherein a first section of a compressed data band stored in the cache includes the first data and a second section of the compressed data band includes third data; and (2) in response to initiating the update routine, replacing the first data within the compressed data band with the second data without decompressing the third data. Numerous other aspects are provided.

34 Claims, 16 Drawing Sheets

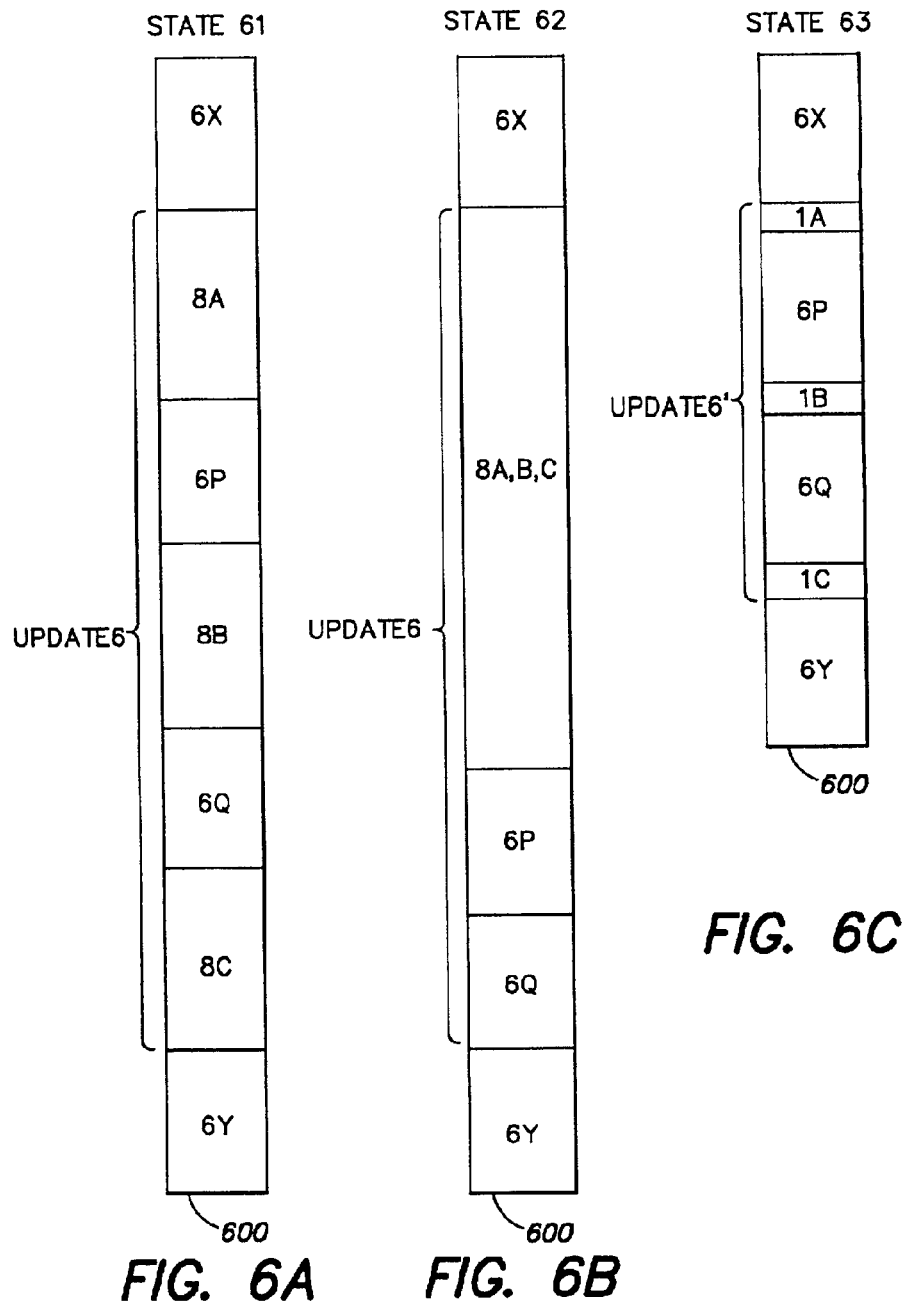

METHOD AND SYSTEM FOR UPDATING DATA IN A COMPRESSED READ CACHE

FIELD OF THE INVENTION

The present invention relates to cache memory. In particular, the present invention relates to a method and system for updating data in a compressed read cache used with direct access storage devices.

BACKGROUND OF THE INVENTION

In data processing systems such as computers and networked workstations, instructions and associated data are transferred from storage devices to one or more processors for processing, and the resulting data generated by the one or more processors typically is returned to the storage devices. Thus, typical processing operations involve frequent and repetitive reading and writing from/to storage devices. As a result, storage access delays are often a primary limitation in the performance of data processing systems; and improving storage access speed may significantly improve the performance of data processing systems.

Due to cost considerations and other design constraints, the use of storage devices having relatively long access times (e.g., hard disk drives or other similar direct access storage devices (DASD's)) is often required. To overcome the resulting performance drawbacks associated with DASD's, cache memories or "caches" may be employed.

A cache typically includes a relatively small, but relatively high speed, bank of memory, that can be more rapidly accessed by a processor than the storage device that the cache services. More specifically, a write cache is used to temporarily store data being written by a processor to a storage device. The processor writes data into the write cache, and thereafter the data is transferred or "destaged" from the write cache to the appropriate storage device. On the other hand, a read cache duplicates storage locations in a storage device, so that when a particular storage location duplicated in the read cache is accessed by a processor, the processor may rapidly access the read cache instead of waiting for access to the storage device.

Generally, a cache has an associated cache directory which stores information regarding the storage locations (of the storage device with which the cache is associated) currently stored in the cache. Thus, when a processor requests access to a particular storage location, the cache directory is accessed to determine whether that storage location is in the cache. If so, the requested storage location may be accessed via the cache. Otherwise, the storage location may be accessed from the storage device with which the cache is associated and/or may be established in the cache, if appropriate.

Typically, sequential storage locations in a storage device such a DASD can be read from or written to rapidly. For example, a disk drive may be arranged into tracks and sectors, so that sequential data can be rapidly read from or written to sequential tracks and sectors of the disk drive. However, long access delays may be incurred when reading or writing data at disparate storage locations of a disk drive. For example, a disk drive typically incurs a substantial delay when moving from one track and sector to another, nonadjacent track and sector.

In view of the rapid access that can be made to sequential storage locations in a storage device, a cache associated with the storage device typically is organized into "lines", which are relatively long sequences of data from sequential storage locations of the storage device. When storage locations of a storage device are written to using a write cache, the data written into the cache is arranged into cache lines, and one or more sequential cache lines are simultaneously destaged to sequential storage locations of the storage device. Similarly, when storage locations of a storage device are duplicated into a read cache, typically the data from the relevant storage locations as well as neighboring storage locations of the storage device, are brought into a line of the cache.

To store more data in a read cache, data may be compressed prior to being written into the cache memory. Such a cache is referred to as a compressed read cache memory. When an update is made to a compressed read cache memory, it is generally not efficient to decompress and recompress an entire cache line, particularly when the update is to a small section of data of the cache line. For example, a typical update to a cache line containing 256 kbytes of data may be as small as 512 bytes. Nonetheless, conventional compressed read caches require such decompression/recompression of data during updates.

In view of the foregoing, it would be desirable to have a method and a system for updating data in a compressed read cache memory which allow updating of a section of data in a cache line without requiring decompressing and recompressing of the entire cache line. In addition, it would be desirable to have a method and a system that reduce the need to remove data from a cache memory when updating data in the cache memory, and/or that accurately determine which data to remove from the cache memory when removal of data is unavoidable.

SUMMARY OF THE INVENTION

In accordance with a first aspect of the invention, a first method is provided for updating a compressed cache. The first method includes the steps of (1) initiating an update routine for replacing first data stored within the cache with second data, wherein a first section of a compressed data band stored in the cache includes the first data and a second section of the compressed data band includes third data; and (2) in response to initiating the update routine, replacing the first data within the compressed data band with the second data without decompressing the third data.

In accordance with a second aspect of the invention, a second method is provided for updating a compressed cache. The second method includes the steps of (1) initiating an update routine for replacing first data stored within the cache with second data, wherein a first section of a compressed data band stored in the cache includes the first data and a second section of the compressed data band includes third data; and (2) in response to initiating the update routine (a) supplementing one or more resources utilized by the first data with a number of additional resources so as to accommodate the second data if the one or more resources utilized by the first data are insufficient to accommodate the second data; and (b) replacing the first data within the compressed data band with the second data without decompressing the third data.

Numerous other aspects are provided, as are apparatus and computer program products. Each inventive computer program product may be carried by a medium readable by a computer (e.g., a carrier wave signal, a floppy disk, a hard drive, a random access memory, etc.).

Other objects, features and advantages of the present invention will become more fully apparent from the follow-

BRIEF DESCRIPTION OF THE DRAWINGS

FIGS. 6A–6C illustrate three states of a PTE array of a resident CL record during another exemplary update routine in which new data is more compressible than the data it replaces;

DETAILED DESCRIPTION

Figure 1:
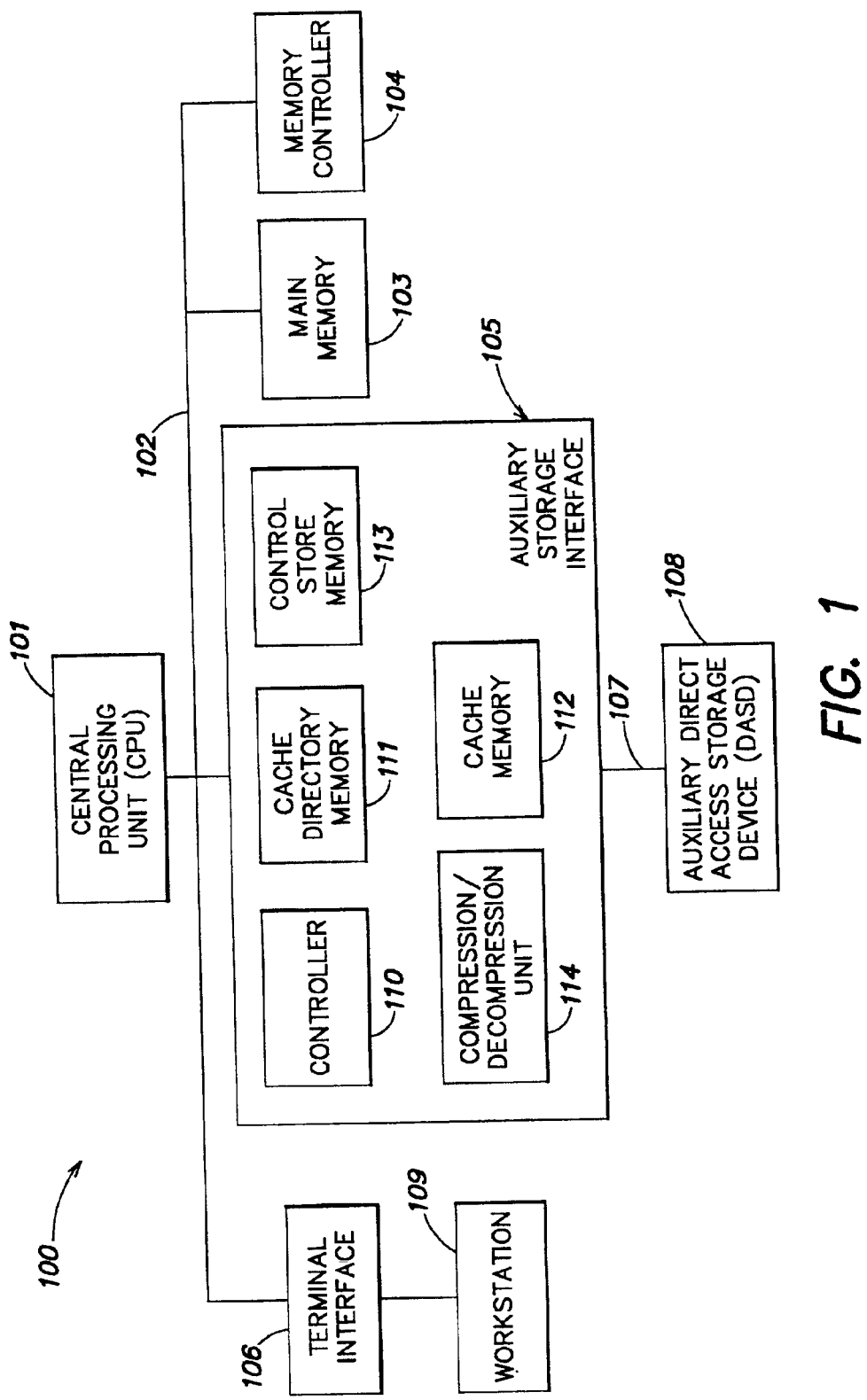
FIG. 1 is a block diagram of an exemplary computer system for implementing the present invention.

The present invention provides methods and apparatus for updating data in a compressed read cache memory. As described below, the invention allows at least a portion of a cache line of a compressed read cache memory to be updated without requiring the entire cache line to be decompressed and recompressed. A significant improvement in data storage efficiency is thereby realized.

In the embodiment of the invention described herein, data within a compressed read cache memory is organized in cache lines, also referred to as data bands. In one particular embodiment, each data band can store 256 kbytes of data, and the data within each data band is divided into 64, 4-kbyte data blocks.

Each data band is managed by a resident CL record that resides in a cache memory directory associated with the cache memory. Each resident CL record includes numerous information fields that include, among other things, information regarding (1) the logical band address for the data band being managed by the resident CL record; (2) the state of the resident CL record (e.g., whether the resident CL record is idle or in use); (3) various statistics regarding use of the data band managed by the resident CL record; (4) various pointers for linking the resident CL record with other resident CL records associated with data stored within the cache memory; and (5) page table entries (PTEs) associated with the resident CL record.

As described further below, a PTE is a pointer that points to a portion of a data block of a data band. In one embodiment of the invention, 8 PTEs are employed to point to one 4 kbyte block of uncompressed data. If the data block is compressed such that the data block requires fewer than 4-kbytes of storage, fewer PTEs are required to point to the data block. For example, if a 4-kbyte data block is compressed by a factor of 2, only 4 PTEs are required to point to the data block (when compressed). The number of PTEs required to point to a data block thus indicates the compressability of the data being pointed to. PTEs are located in a control store memory associated with the cache memory, and each resident CL record of the cache memory directory includes PTE set pointers that point to PTEs in the control store memory.

In at least one embodiment of the invention, each resident CL record contains a nibble array which contains one nibble for each of the 64, 4-kbyte data blocks associated with the resident CL record (e.g., to allow tracking of which PTEs point to compressed data for a particular 4-kbyte data block of the resident CL record). Each nibble contains the number of PTEs required to point to the compressed data for one of the 4-kbyte data blocks of the resident CL record). To save space in each resident CL record, PTEs are grouped in sets of 16 PTEs, and a pointer to each PTE set of a resident CL record is stored in the resident CL record. In this manner, each PTE set contains references (PTES) to the actual read cache page (pointed to by the PTEs of the PTE set). PTEs are logically swapped in a resident CL record, but are physically swapped within the PTE sets attached to the resident CL record. Additional details regarding CL records, PTEs and PTE set pointers are provided below with reference to FIGS. 1–7.

In accordance with the present invention, a portion of a cache line may be updated with new data without requiring the entire cache line to be decompressed and recompressed by moving PTEs of a resident CL record so as to create (or adjust) "holes" for the new data that is to be included in the cache line. That is, sufficient free PTEs to accommodate the new data are provided. In this manner, the compression of the non-updated portion of the cache line remains unchanged or "constant" during the update.

In a first aspect of the invention, if the new data to be included in a cache line during an update is already compressed, the cache line may be updated by:

1. determining if additional PTEs are needed to accommodate the new data (e.g., if the new data is less compressible than the data it is replacing);
2. if additional PTE sets are needed, allocating additional PTE sets to the respective resident CL record;
3. adjusting hole size in the resident CL record where the new data is to replace the existing data by moving (or "swapping") PTEs of the resident CL record;
4. performing a page-to-page copy of the new data into pages of the read cache memory; and
5. freeing any extra PTE sets of the resident CL record (e.g., if the new data compresses more than the data it replaces).

If the new data is uncompressed, but is already in 4-kbyte blocks, the cache line may be updated by compressing the new data and then performing steps 1–5 (above). Alternatively, if the new data is uncompressed and not in 4-kbyte blocks, the cache line may be updated by:

1. decompressing the existing data from the resident CL record (e.g., by decompressing only the data within the span of the update operation, but expanded to 4-kbyte block boundaries);
2. merging the new data with the data that was decompressed, so as to incorporate the new data while keeping data not being updated;

3. recompressing the merged data; and 4. repeating previously described steps 1–5.

By maintaining references (pointers) to PTEs in a resident CL record, PTEs may be rearranged so that data that is unchanged during an update remains in its relative, sequential position within the cache line while PTEs employed to point to new data are inserted or deleted (attached or detached) from the resident CL record. In this manner, references (pointers) to data, rather than the data itself, are moved within the cache memory. An exemplary update routine in accordance with the present invention is described below with reference to FIGS. 8A–8C.

Figure 9:
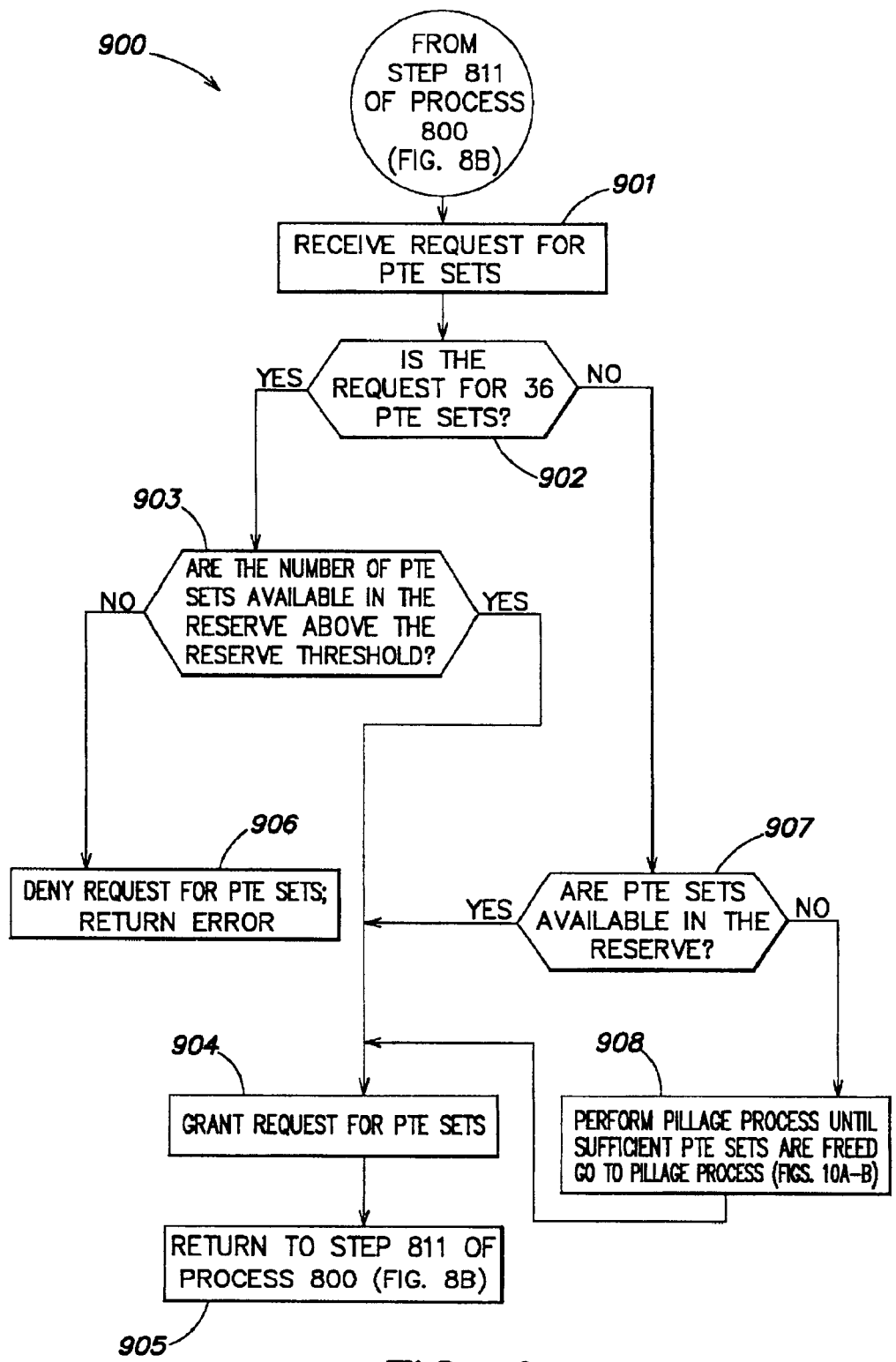
FIG. 9 is a flowchart illustrating an exemplary reserve process of the compressed read cache update routine of FIGS. 8A–8C.

To minimize removal of data from the compressed read cache memory, a reserve of non-used or "free" PTE sets is maintained (e.g., in a read cache page pool). These free PTE sets may be used during subsequent updates to the read cache memory. FIG. 9 illustrates an exemplary reserve process for employing free PTE sets during an update routine in accordance with the present invention.

Figure 10A:
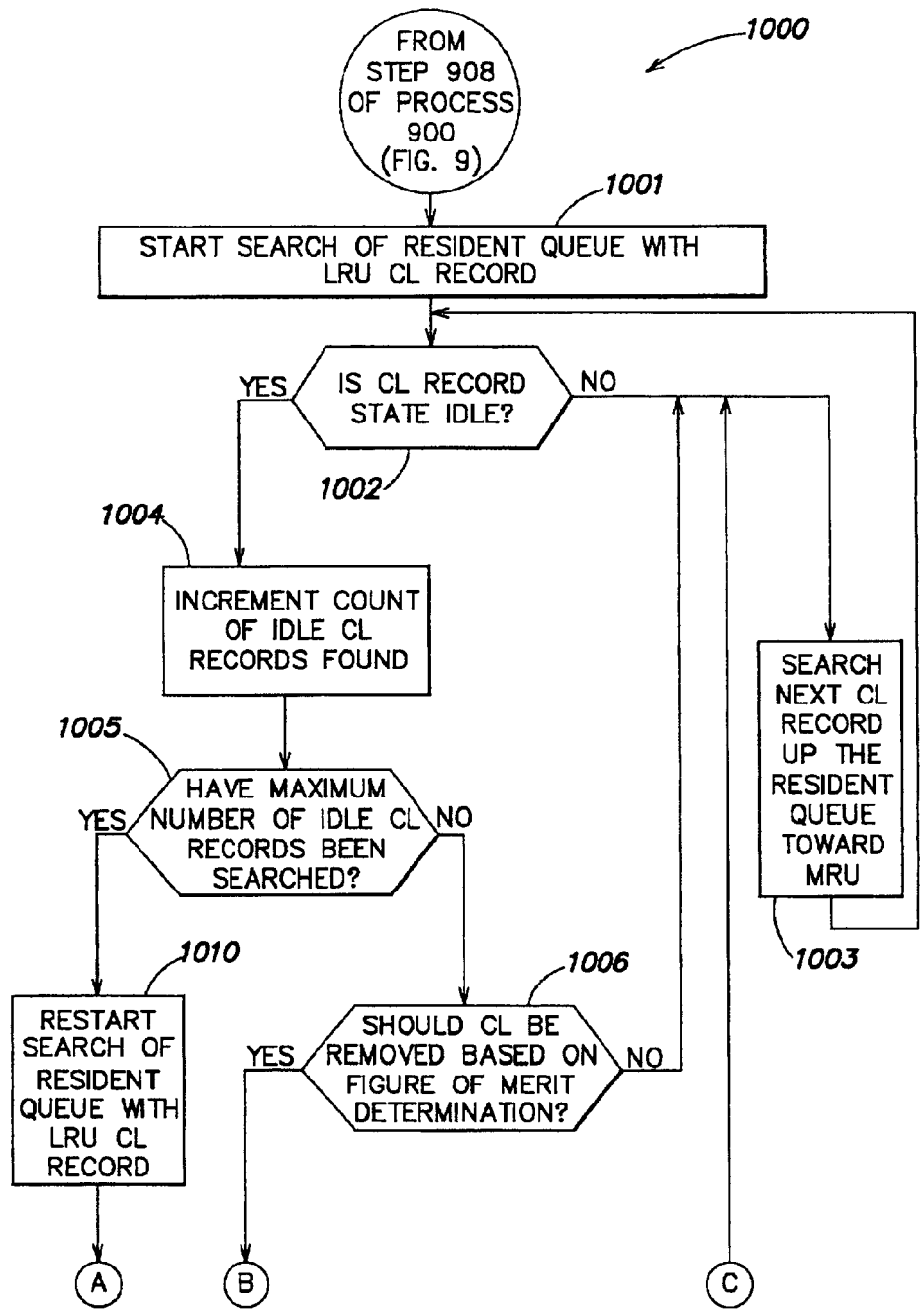
FIGS. 10A–10B are a flowchart illustrating an exemplary pillage process of the compressed read cache update routine of FIGS. 8A–8C.
Figure 10B:
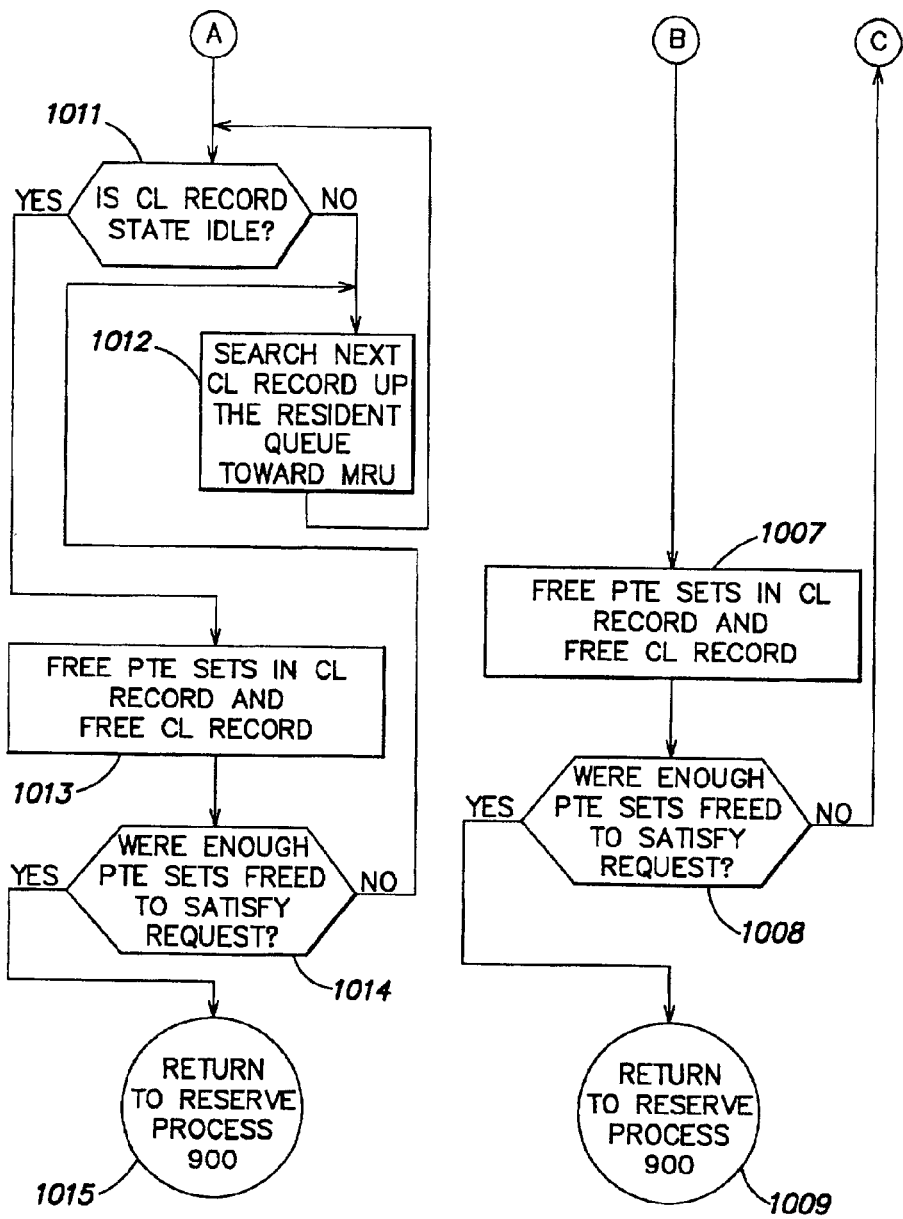

During certain updates to a compressed read cache memory, data must be removed from the cache memory to accommodate new data. To determine which resident CL records to remove during an update, a figure of merit (FOM) is associated with each resident CL record (e.g., based on various statistics for the resident CL record and/or the number of PTEs it contains). Based on the FOM, the "least valuable" resident CL records may be removed from the cache memory when additional resources are required during an update to the cache memory. FIGS. 10A–10B illustrate an exemplary process for removing resident CL records in accordance with the present invention.

FIG. 1 is a block diagram of an exemplary computer system for implementing the present invention. Referring to FIG. 1, the computer system 100 includes a main or central processing unit (CPU) 101 connected through a system bus 102 to a main memory 103, a memory controller 104, an auxiliary storage interface 105, and a terminal interface 106. The memory controller 104, through use of a processor separate from the CPU 101, moves information between the main memory 103, the auxiliary storage interface 105, and the CPU 101. While for the purposes of explanation, the memory controller 104 is shown as being separate from the CPU 101 and the main memory 103, those skilled in the art will understand that, in practice, portions of the functions provided by the memory controller 104 may reside in the circuitry associated with the CPU 101 and/or the main memory 103. Further, while the present invention is described with reference to moving requested information between the main memory 103, the auxiliary storage interface 105 and the CPU 101, those skilled in the art will appreciate that the present invention will apply equally to any storage configuration, regardless of the number and type of the storage devices involved.

Referring to FIG. 1, the auxiliary storage interface 105, which operates under the control of software and/or firmware of a controller 110, allows the computer system 100 to store and retrieve information from an auxiliary direct access storage device (DASD) 108, such as a magnetic disk, magnetic tape or optical storage device connected to the auxiliary storage interface 105 via a bus 107 such as a bus conforming to Small Computer Systems Interface (SCSI) standards. The auxiliary storage interface 105 also includes a cache memory 112 for storing bands of data ("data bands") read from or written to storage locations of auxiliary DASD 108. In addition, the auxiliary storage interface 105 is provided with a cache directory memory 111 used by the controller 110 to store a cache directory. The cache directory memory 111 may be a volatile or non-volatile memory storing an indication of which storage locations of the auxiliary DASD 108 are "within" the cache memory 112 (e.g., for which storage locations the cache memory 112 contains data), as discussed below.

Referring again to FIG. 1, the auxiliary storage interface 105 is further provided with a compression/decompression unit 114, and a control store memory 113. Operating under the control of the controller 110, the compression/decompression unit 114 may be configured to decompress compressed data in the cache memory 112, and to compress new data to store in the cache memory 112 in response to an update routine called by the controller 110. The control store memory 113 is configured to store pointers to data stored in the cache memory 112 (e.g., page table entry (PTE) pointers indexing stored pages (e.g., each 512 bytes of resource) in the cache memory 112 as described further below with reference to FIGS. 3A–3B).

The terminal interface 106 may be configured to allow users to communicate with the computer system 100, for example, through one or more programmable workstations 109 coupled thereto.

Although the system 100 depicted in FIG. 1 contains only a single main CPU 101 and a single system bus 102, it will be understood that the invention also applies to computer systems having multiple CPUs and buses. Furthermore, it will be appreciated that the computer system 100 is merely an example of one system upon which processes in accordance with principles of the present invention may execute; and, as alternative system designs may be used, principles of the present invention are not limited to any particular configuration shown herein.

In general, the processes executed to implement the illustrated embodiments of the invention, whether implemented as part of an operating system or a specific application, program, object, module, or sequence of instructions or the like will be referred to herein as "computer programs". The computer programs typically comprise instructions which, when read and executed by one or more processors in the devices or systems of a computer system consistent with the invention, cause those devices or systems to execute steps or generate elements embodying the various aspects of the present invention. Moreover, while the invention has and hereinafter will be described in the context of fully functioning computer systems, those skilled in the art will appreciate that computer programs for carrying out the various embodiments of the invention are capable of being distributed as one or more computer program products in a variety of forms, and that the invention may be employed regardless of the particular signal bearing media used to carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Figure 2:
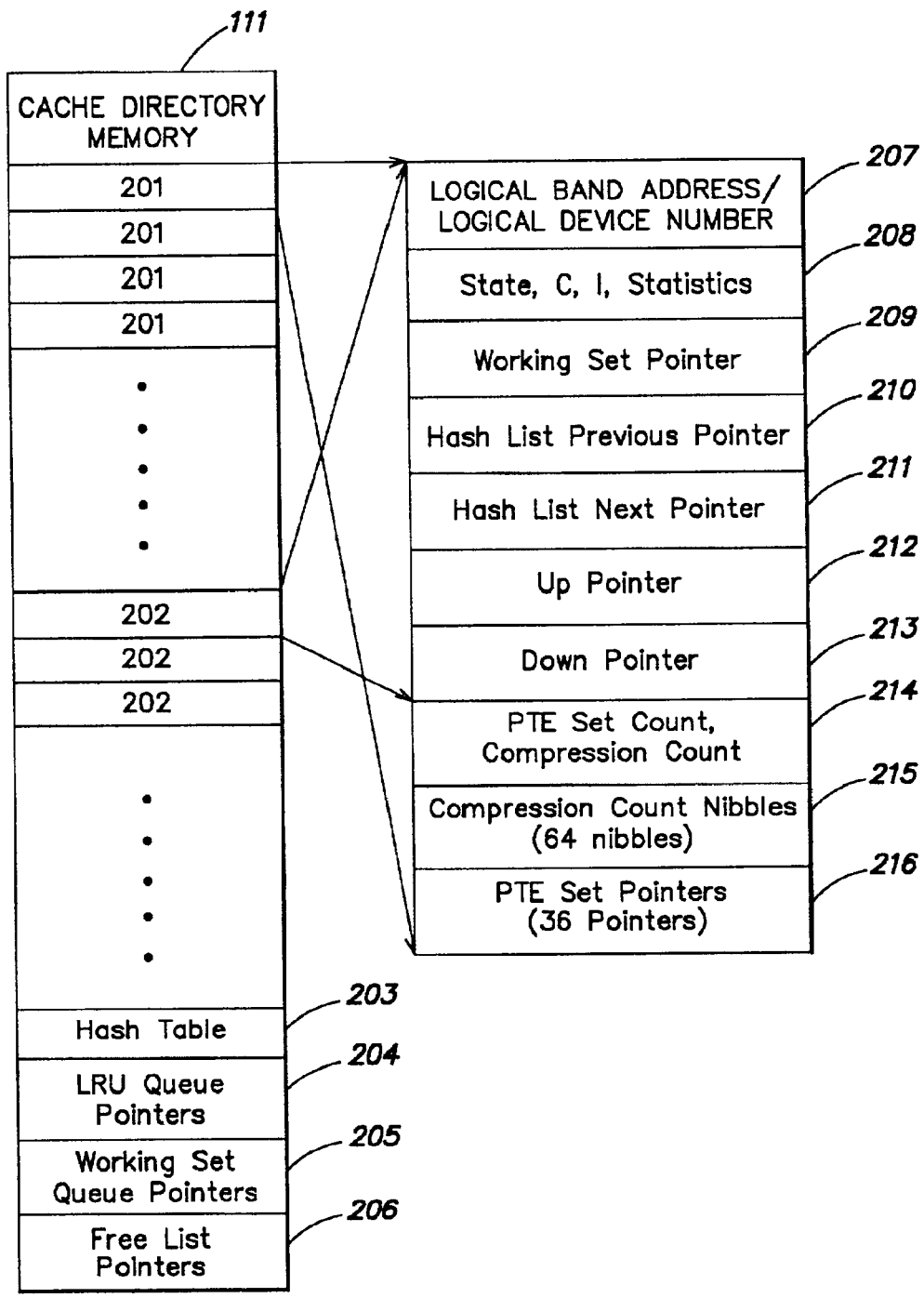
FIG. 2 is a data structure diagram illustrating exemplary contents of the cache directory memory shown in FIG. 1.

FIG. 2 is a data structure diagram illustrating exemplary contents of the cache directory memory 111 shown 111 includes resident cache line (CL) records 201 and non-resident CL records 202. In one embodiment, each resident CL record 201 consumes 208 bytes of storage in the cache directory memory 111, while each non-resident CL record 202 consumes 28 bytes of storage in the cache directory memory 111.

The resident CL records 201 are used to manage the storage of a predetermined size of a contiguous band of data (e.g., 256 kbytes which are divided into 64, 4-kbyte segments) from the auxiliary DASD 108. Each of the non-resident CL records 202 is used to collect information regarding another predetermined size band of data from the auxiliary DASD 108 which is not resident in the cache memory 112 but which is a potential candidate for storage in the cache memory 112 (e.g., the non-resident CL records 202 thereby keep track of the statistics of the data which is not resident in the cache memory 112). The cache directory memory 111 may include an equal or unequal number of resident CL records 201 and non-resident CL records 202.

Referring to FIG. 2, the cache directory memory 111 is allocated to include sufficient CL records to accommodate the size of the cache memory 112 that may be installed in the auxiliary storage interface 105. The size of the cache memory 112 and the number of resident and nonresident CL records 201, 202, respectively, available for managing the cache memory 112 can be chosen based on desired performance.

In addition to the resident and non-resident CL records 201, 202, the cache directory memory 111 includes a hash table 203, used as an index to locate a respective resident or non-resident CL record 201, 202 for a particular storage location of the auxiliary DASD 108 (as discussed below), and least recently used (LRU) pointers 204, working set queue (WSQ) pointers 205 and free list pointers 206. The LRU queue pointers 204, each include one "head" and one "tail" pointer (FIG. 4B) identifying the beginning and end, respectively, of a resident queue of resident CL records 201, and one "head" and one "tail" pointer (FIG. 4B) identifying the beginning and end, respectively, of a non-resident queue of non-resident CL records 202 (as described further below with reference to FIGS. 4A–4B). The WSQ pointers 205, one for each of the read or write operations that may operate on the cache memory 112, are each used in identifying a working set of resident or non-resident CL records 201, 202 that are included in a working set for the associated read or write operation. The use of WSQ pointers 205 is discussed in further detail below with reference to FIGS. 4A–4B. The free list pointers 206 are used in maintaining a list of free resident CL records 201 and a list of free non-resident CL records 202 (also described further with reference to FIGS. 4A–4B).

Referring again to FIG. 2, exemplary detailed internal structures of a resident CL record 201 and a non-resident CL record 202 are also illustrated. In particular and in accordance with one exemplary embodiment, the resident CL record 201 may be divided into ten fields, each of which stores data needed for the management of the cache directory memory 111, while the non-resident CL record 202 may be divided into seven fields. A first 4-byte field 207 of both the resident CL record 201 and the non-resident CL record 202 stores a logical band address for the band of data being managed by the resident or non-resident CL records 201, 202. The logical band address (e.g., 23 bits) in the field 207 of the resident CL record 201 or the non-resident CL record 202 is associated with the address of the first block of data of the auxiliary DASD 108 that is included in the band of data (e.g., 256 kbytes) that is being managed by the respective resident or non-resident CL record 201, 202. In one embodiment, each address of the auxiliary DASD 108 and other storage devices in use, is in the form of a 32-bit logical block address, where the 32-bit logical block address uniquely identifies a 512 byte block of storage space of the auxiliary DASD 108.

Referring to FIG. 2, the first 4-byte field 207 in the resident or the non-resident CL records 201, 202 also stores a logical device number (e.g., 8 bits) for the auxiliary DASD 108 in which data of the data band (of the auxiliary DASD 108) managed by the respective resident or non-resident CL record 201, 202 is stored. In this manner, multiple storage devices may be managed by the auxiliary storage interface 105 illustrated in FIG. 1 using the cache memory 112. For example, the logical device number identified in the field 207 may indicate in which storage device the managed band of data is stored. In combination, the logical band address (e.g., 23 bits) and logical device number (e.g., 8 bits) in the field 207 point to a specific data band of a particular auxiliary DASD 108 attached to the auxiliary storage interface 105.

Referring again to FIG. 2, the second 4-byte field 208 of the resident CL record 201 or the non-resident CL record 202 stores various information regarding the state of the data band being managed by the respective resident or non-resident CL record 201, 202 in the cache memory 112. In particular, the field 208 includes state information regarding the use of the respective resident or non-resident CL record 201, 202. Specifically, each CL record 201, 202 may have one of four states: statistics only (SO), idle, read in progress (RIP) and, populate in progress (PIP). The SO state indicates that a non-resident CL record 202 is being used only to collect statistics on the use of the corresponding data band, but that the data band is not presently resident in the cache memory 112. As will be seen below, all non-resident CL records 202 are in the SO state, while the state for each resident CL record 201 may vary between Idle, RIP and PIP states.

The Idle state indicates that the data band managed by the respective resident CL record 201 is currently resident in the cache memory 112, and that the data in the data band is currently available (e.g., is not being read or written at the present time). The RIP state indicates that the data band managed by the respective resident CL record 201 is currently resident in the cache memory 112, but that the data in the data band is currently being read by a cache management process and is thus currently unavailable. Finally, the PIP state indicates that the data band managed by the respective resident CL record 201 is being filled by a cache management process with data from the auxiliary DASD 108, or with data written to that data band by a processor, and thus is unavailable.

As will be discussed below in further detail, a resident CL record 201 progresses through these four states in a controlled manner, moving from one state to another as respective write and read operations are performed upon the respective resident CL record 201. As an operation is performed on a working set of resident CL records 201, the state of each respective resident CL record 201 that is involved in the operation is updated to the appropriate state. Furthermore, when a read or write operation attempts to build a working set for the operation, the state of each resident CL record 201 in the working set is evaluated, and if the state of a resident CL record 201 in the working set is inconsistent with the operation to be performed, the operation is not performed on the corresponding resident CL record 201. In this manner, collisions between operations are prevented (e.g., simultaneous attempts to use the same resident CL record and associated data for inconsistent purposes).

For example, a read operation from the cache memory 112 is permitted only if all of the resident CL records 201 relevant to the read operation are in the idle state. If this is not the case (e.g., if data from a particular data band relevant to the read operation is being filled into the cache memory 112, and thus one or more resident CL records 201 are in the PIP state), the non-idle state of one or more resident CL records 201 will be detected during preparation for the read operation. As a result, the read operation will be suspended. A similar sequence of events will occur if a resident CL record 201 needed for a read operation is in the process of being read and thus is in the RIP state. Additionally, when a read operation proceeds, the state of all relevant resident CL records 201 will be changed from the Idle state either to the RIP state or, in some particular circumstances described below, to the PIP state, to indicate that an operation is in progress using the respective resident CL records 201.

In the event of a collision of the kind described above, a flag in each relevant resident CL record 201 is set to indicate the occurrence of the collision. This flag "C", also known as the collision bit, is included in the field 208 of each resident record 201. (The collision bits/flags of the non-resident CL records 202 are not employed.) When a collision is detected and an operation is suspended, the collision bit is set in the corresponding resident CL record 201 involved in the collision. When an operation which uses a resident CL record 201 terminates, that operation reviews the corresponding resident CL record 201 to determine whether the collision bit is set, and if so, any previously suspended operation which experienced a collision is restarted.

Collisions may occur during read or write operations. It should be noted, however, in the context of the read cache memory, a write operation, when not suspended due to a collision, will always save the written data to the auxiliary DASD 108 as well as, if necessary, to the cache memory 112. Additionally, a read operation will only utilize the cache memory 112 if all of the data of the auxiliary DASD 108 that is to be read is either in the cache memory 112 and in the Idle state, or should be made resident in the cache memory 112 as a part of performing the read operation. If there is data accessed by a read operation which is not in the cache memory 112 and not, based on an evaluation of the statistics for the data, worth being brought into the cache memory 112, then the read operation will directly access the auxiliary DASD 108 for the desired data.

As a consequence of the parallel execution of multiple read and write operations, it is possible that while a resident CL record 201 is in use by a first operation, a second operation may determine that the resident CL record 201 should be invalidated, e.g., because the data band managed by the respective resident CL record is encountering an excessive number of write operations and as a result is diminishing the overall efficiency of the cache memory 112. In this case, a flag in the corresponding resident CL record 201 is set to indicate that upon completion of the first operation, the respective resident CL record 201 should be invalidated. This flag "I", also known as the invalidate bit, is included in field 208 of each resident or non-resident CL record 201, 202. (The invalidate bits/flags of the non-resident CL records 202 are not employed.) When an operation which uses a resident CL record 201 terminates, the corresponding resident CL record 201 is reviewed to determine whether the invalidate flag is set, and if so, the respective resident CL record 201 is invalidated, as appropriate.

Referring yet again to FIG. 2, also included in field 208 of each resident or non-resident CL record 201, 202 is a statistics field. This field is used to collect information on the previous use of the data band managed by the respective resident or non-resident CL record 201, 202. In one embodiment, the statistics field may be a 2 byte (16-bit) counter having a positive integer value from 0 to 100, although other count ranges may be used. When a read operation is made to a data band (e.g., 256 kbytes) which is being managed by a resident or a non-resident CL record 201, 202, the statistics counter is increased by an amount such as 6, determined based on empirical testing, to reflect that there is or would be a benefit to including this data band in the cache (e.g., so as to enhance processing speed). When a write operation is made to a data band which is being managed by a resident or a non-resident CL record 201, 202, the statistics counter is decreased by an amount such as 4, based again on empirical testing, to reflect that there is or would be a penalty to including this data band in the cache (e.g., by deteriorating processing speed).

Each resident and non-resident CL record 201, 202 also includes a field 209. Each resident CL record 201 employs the field 209 for storing a working set pointer that is used when incorporating the resident CL record 201 into a working set. The field 209 is not employed in non-resident CL records 202. Working sets of resident CL records 201 are linked lists of resident CL records 201, established as part of each read or write operation performed on the cache memory 112. The working set pointer stored in the field 209 in each resident CL record 201 identifies the next resident CL record 201 in a list.

The resident and non-resident CL records 201, 202 further include fields 210 and 211 for storing "previous" and "next" hash list pointers, respectively. These pointers index a corresponding resident or non-resident CL record 201, 202 into a doubly-linked list headed by one of the hash table entries, so that the resident or non-resident CL record 201, 202 for a particular storage location of the auxiliary DASD 108 can be rapidly identified from the address of that storage location.

The resident and non-resident CL records 201, 202 include fields 212 and 213 for storing "up" and "down" pointers. These pointers are used to incorporate a respective resident or non-resident CL record 201, 202 into a doubly-linked list which forms one of the two LRU (least recently used) queues of the corresponding resident or non-resident CL records 201, 202. There is one such LRU queue for resident CL records 201 and one such queue for non-resident CL records 202.

In addition to including the fields 207–213, each of the resident CL records 201 also includes fields 214, 215 and 216 for storing page table entry (PTE) set count and compression count (field 214), compression count nibbles (field 215) and PTE set pointers (field 216). In one embodiment, 64 compression count nibbles (field 215) and 36 PTE set pointers (field 216) are employed, although other numbers may be used. The PTE set count stored in the field 214 maintains the number of PTE sets attached to the corresponding resident CL record 201. The PTE sets are attached consecutively in the PTE set pointers starting with the first pointer as discussed below. The compression count in the field 214 identifies the number of PTEs in use.

As stated, in an embodiment of the invention in which 256 kbyte data bands are employed, each data band may include 64, 4 kbyte data blocks. In one or more aspects of the invention, to accommodate possible expansion of data during compression and/or to allow uncompressed 4 kbyte data blocks to be identified, up to 9 PTEs per 4 kbyte data block may be employed (e.g., up to 576 PTEs per data band, where each PTE corresponds to a 512 byte page in the cache memory 112). When up to 9 PTEs per 4 kbyte data block are employed, as many as 36 PTE sets of 16 PTEs may be associated with each resident CL record 201. In general, only a small fraction of the 36 PTE sets are employed during normal operations of the cache memory 112. At least four PTE sets (e.g., 64 PTEs) are required.

The compression count nibbles stored in field 215 of each resident CL record 201 maintain information related to the compression of each of the blocks of data (e.g., 64, 4-kbyte blocks of data) which together comprise the data band (e.g., a 256 kbyte band of data) of the resident CL record 201. Each of the blocks of data (e.g., 4 kbytes uncompressed) represents a compression unit. More specifically, as discussed in further detail below, the compression count nibbles stored in field 215 indicate how each block of data in a data band of a resident CL record 201 is compressed (e.g., by identifying the number of PTEs pointing to each block of data once the block of data is compressed). Lastly, the PTE set pointers stored in field 216 of each resident CL record 201 are pointers to the respective PTE sets, where a PTE set comprises an array which contains pointers (e.g., PTEs) that each reference an area (e.g., 512 bytes) of cache memory 112 (FIG. 1). With 36 possible PTE sets for each resident CL record 201, and each PTE set including 16 PTEs, there are 576 possible PTEs in each resident CL record 201.

Figure 3A:
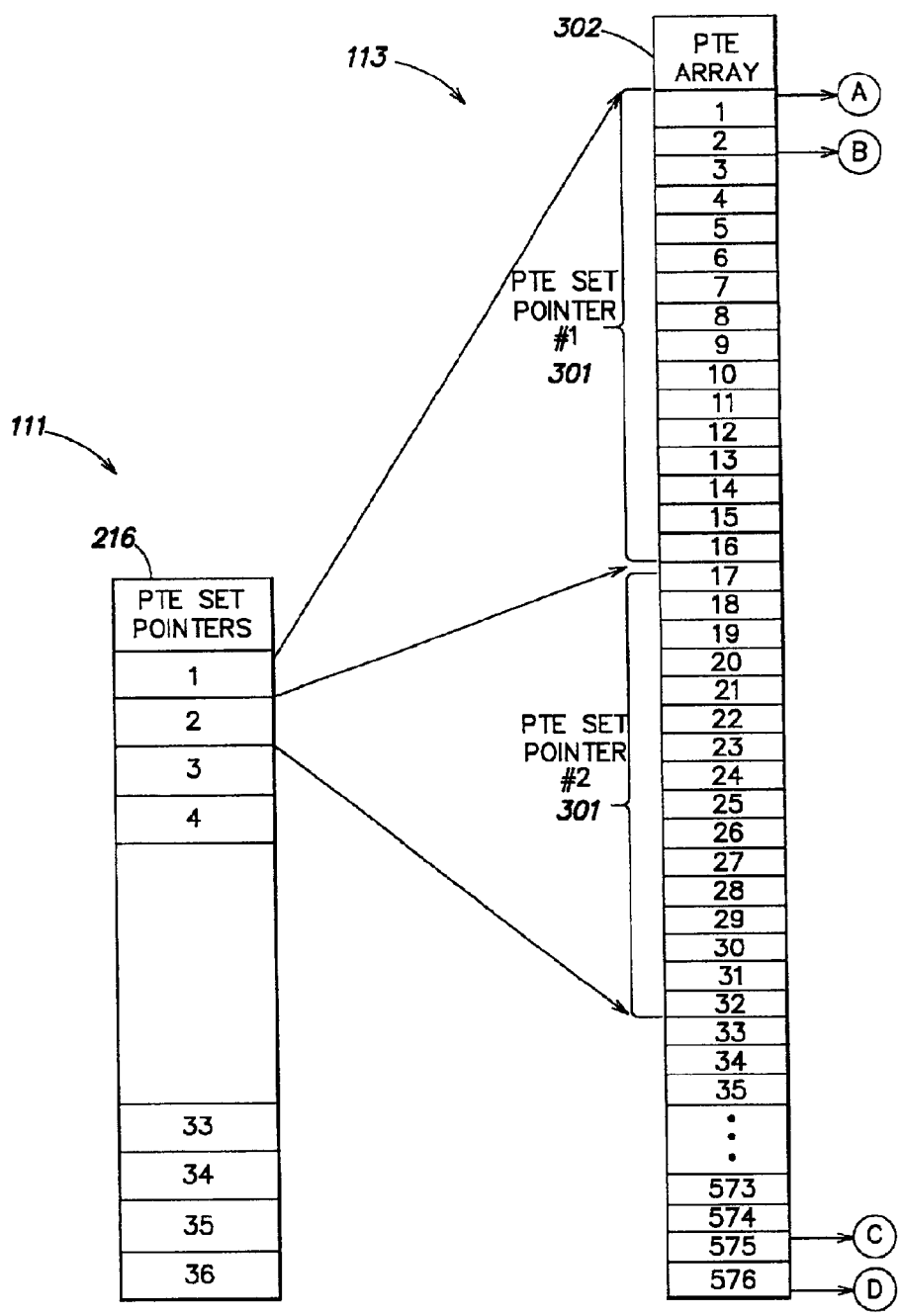
FIGS. 3A–3B are a data structure diagram illustrating exemplary contents of the control store memory and the cache memory shown in FIG. 1.
Figure 3B:
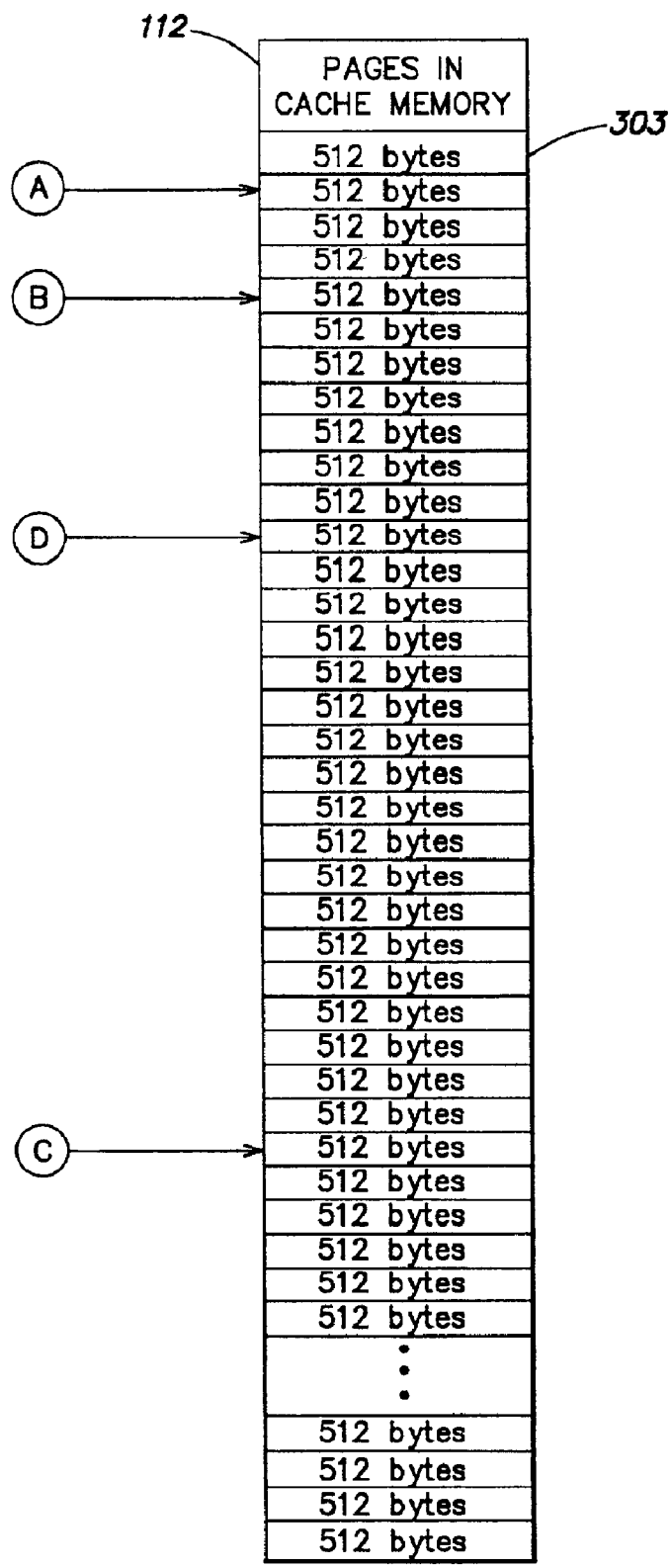

FIGS. 3A–3B are a data structure diagram illustrating exemplary contents of the control store memory 113 and the cache memory 112 shown in FIG. 1. Referring to FIGS. 3A–3B, each of the PTE set pointers (e.g., 36 possible PTE pointers) stored in the field 216 of each resident CL record 201 is configured to point to a corresponding PTE set 301 stored in the control store memory 113. In the embodiment of FIGS. 3A–3B wherein 36 possible PTE sets are employed, each of the 36 possible PTE sets 301 in the control store memory 113 includes 16 PTEs, such that PTEs 1–16 in PTE array 302 correspond to the first of the 36 possible PTE sets, the next sixteen PTEs 17–32 in PTE array 302 correspond to the second of the 36 possible PTE sets, and so on. As discussed above, it can be seen from FIGS. 3A–3B, that with 36 possible PTE sets for each resident CL record 201, there are up to 576 PTEs in the PTE array 302, each of which is individually configured to address a respective one of pages 303 (e.g., 512 byte pages) in the cache memory 112. It should be noted that the pages 303 of compressed data in the cache memory 112 may not be organized sequentially by the corresponding PTEs in the PTE array 302. For example, as shown in FIGS. 3A–3B, the first PTE in the PTE array 302 addresses the second page in the cache memory 112, and the second PTE in the PTE array 302 addresses the fifth page in the cache memory 112. Additionally, PTEs may be moved among the PTE sets within each resident CL record 201 (e.g., swapped within the PTE array 302 with other PTEs) as discussed in further detail below.

Figure 4A:
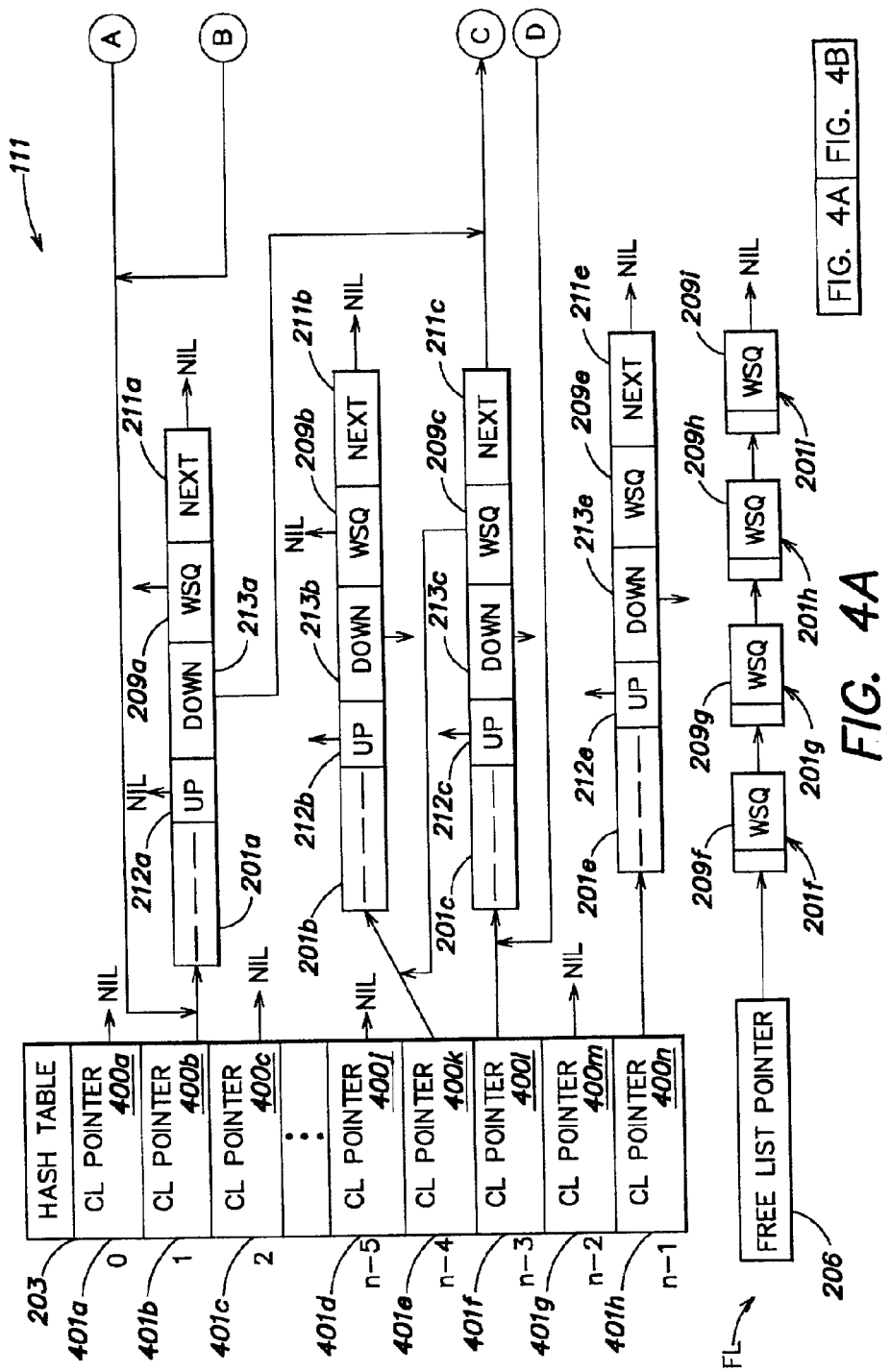
FIGS. 4A–4B are data structure diagrams illustrating an exemplary organization of the contents of the cache directory of FIG. 2 into lists and queues using pointers included in the data structure shown in FIG. 2.
Figure 4B:
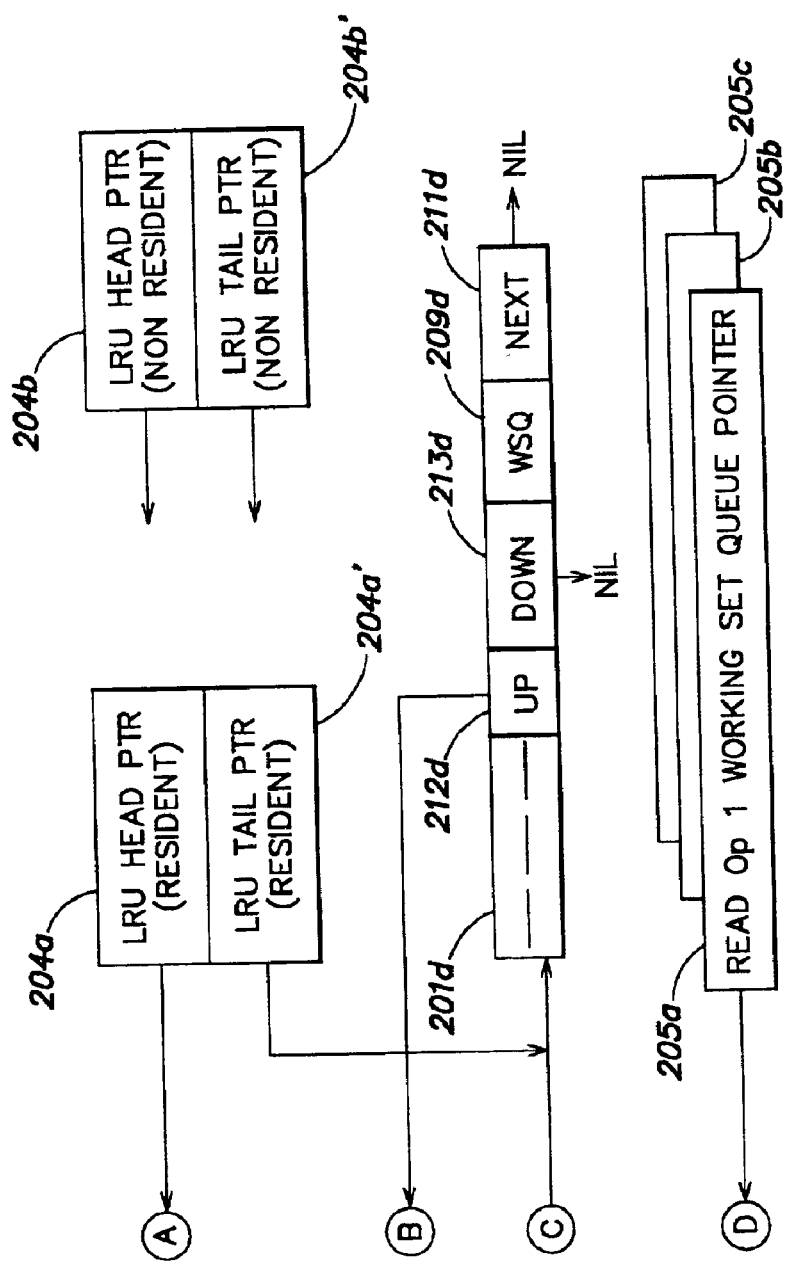

FIGS. 4A–4B are data structure diagrams illustrating an exemplary organization of the contents of the cache directory memory 111 into lists and queues using pointers included in the data structures shown in FIG. 2. Initially, it will be noted that all resident CL records 201 corresponding to bands of data of the auxiliary DASD 108 (FIG. 1) replicated in the cache memory 112, and all non-resident CL records 202 managing statistics and LRU information for bands of data of the auxiliary DASD 108 not replicated in the cache memory 112, are indexed into the doubly-linked lists which extend from the hash table 203 stored in the cache directory memory 111.

Referring now to FIG. 4A, the hash table 203 of FIG. 2 is shown to include a number, n, of entries 400*a–n*, each of which stores a respective resident or a non-resident CL record pointer pointing to a respective resident or non-resident CL record 201, 202. In one embodiment of the invention, the index into the hash table 203 is a number of low order bits of the logical band address of a data band, or an equal number of low order bits of a logical block address of a block in the band excluding, for example, the nine lowest order bits of the logical block address. Thus, to locate a resident or a non-resident CL record 201, 202, if any, which is managing cached data for a given data block of the auxiliary DASD 108 (FIG. 1), the logical block address of the data block is stripped of its least significant bits (e.g., in one embodiment its nine least significant bits), and the appropriate number of the remaining low order bits of the address (e.g., 17 bits, where a 128 k-entry hash table is used) are used as an index into the hash table 203. This process identifies one of the entries 400*a–n* in the hash table 203. If data for the desired data band is in the cache memory 112 or if statistics and LRU information are being managed for the desired data band, there will be a resident or a non-resident CL record 201, 202 in the doubly-linked list of resident and non-resident CL records 201, 202 that extends from the identified entry 400*a–n* in the hash table 203. To locate this resident or the non-resident CL record 201, 202, the pointer in the identified entry 400*a–n* is followed to the first resident or non-resident CL record 201, 202 in the doubly-linked list, and the logical band address and logical device number in the field 207 of the first resident or non-resident CL record 201, 202 in the list are compared to the desired band address and device. If there is a match, then the resident or non-resident CL record 201, 202 that is managing statistics and LRU information for the desired data band has been located. If there is no match, then the next pointer in field 211 (hash list next pointer in FIG. 2) of the current resident or non-resident CL record 201, 202 is followed to the next resident or non-resident CL record 201, 202 in the doubly-linked list. This process continues until a resident or non-resident CL record 201, 202 is located for the desired band, or until the last resident or non-resident CL record 201, 202 in the doubly-linked list is reached.

The last resident or non-resident CL record 201, 202 in the list has a NIL value next pointer in its field 211 (FIG. 2).

Referring back to FIG. 4A, lists of resident or non-resident CL records 201, 202, headed by entries 401*b*, 401*e*, 401*f* and 401*h* of the hash table 203 are shown. As can be seen, entries 401*b*, 401*e*, 401*f* and 401*h* contain pointers leading to CL records 201*a*, 201*b*, 201*c* and 201*e*, respectively, where each of these CL records are the respective first CL records in each list of resident or non-resident CL records 201, 202. The other hash table entries 401*a*, 401*c*, 401*d* and 401*g* contain NIL valued pointers, indicating that there are no resident or non-resident CL records 201, 202, and no data in the cache memory 112 or management of statistics and/or LRU information, for addresses in auxiliary DASD 108 which correspond to those entries.

It will be noted that lists of resident or non-resident CL records 201, 202 can include one or multiple resident or non-resident CL records 201, 202. The lists headed by entries 401*b*, 401*e* and 401*h* of hash table 203 have single entries, namely CL records 201*a*, 201*b* and 201*e*, respectively. In contrast, the list headed by entry 401*f* of hash table 203 has two entries, CL records 201*c* and 201*d* (FIGS. 4A and 4B). Additionally, the lists of resident and non-resident CL records 201, 202 are doubly-linked lists, that is, each resident and non-resident CL record 201, 202 has a next pointer stored in hash list next pointer field 211 which leads to the next resident or non-resident CL record 201, 202 in the list, or has a NIL value if there is no next record, and also has a previous pointer in hash list previous pointer field 210 (as discussed above with reference to FIG. 2) which leads to the previous resident or non-resident CL record 201, 202 in the list. For example, the next pointer stored in hash list next pointer field 211 (as discussed above with reference to FIG. 2) of entry 201c (field 211c) leads to the resident CL record 201d. The next pointer stored in hash list next pointer field 211 of resident CL record 201d (field 211d) has a NIL value (FIG. 4B), indicating that the resident CL record 201d is the last CL record in the list. The previous pointer (not shown) in hash list previous pointer field 210 of resident CL record 201d leads to CL record 201c.

All of the resident and non-resident CL records 201, 202 currently in use are included in the lists which extend from hash table 203. The CL records which are managing data resident in the cache memory 112 are listed along with the CL records that are managing data not resident in the cache memory 112. The resident CL records 201 will be in one of the Idle, RIP or PIP states, while non-resident CL records 202 will always be in the SO state and can be identified as such. The size of the hash table 203 can be chosen arbitrarily, however, for efficiency it is preferred that the hash table 203 have approximately twice as many entries 400a–n as the number of resident and non-resident CL records 201, 202 needed for the cache size supported by the auxiliary storage interface 105, so that on average the number of resident and non-resident CL records 201, 202 listed by a hash table entry 400a–n is less than one.

Other lists of resident and non-resident CL records 201, 202 are generated as operations are performed on the cache memory 112. Specifically, a working set of resident CL records 201 is established prior to each write or read operation performed on the cache memory 112. As noted above with reference to FIG. 2, the cache directory memory 111 includes working set queue pointers 205 which head these working sets of resident CL records 201, one pointer used for each operation that is pending in the cache memory 112. One exemplary working set, comprised of resident CL records 201c and 201b, is illustrated in FIG. 4B. The working set queue (WSQ) pointer 205a for the read operation that built this working set, points to resident CL record 201c (as shown by the arrow that extends from the WSQ pointer 205a in FIG. 4B to the resident CL record 201c in FIG. 4A). The WSQ pointer stored in working set queue pointer field 209 (as discussed above with reference to FIG. 2) of resident CL record 201c (field 209c in FIG. 4A) points to resident CL record 201b. In turn, the WSQ pointer in working set pointer field 209 of the resident CL record 201b (field 209b in FIG. 4A) has a NIL value, indicating that the resident CL record 201b is the last CL record in the working set. Two other working set pointers 205b and 205c are shown in FIG. 4B.

The number of CL records that may be included in a working set depends on the relative size of the data bands employed and the data range of the operation. In one embodiment, the maximum operation size permitted by the auxiliary DASD 108 may be 256 kbytes, and a maximum of two 256 kbyte cache data bands will be affected by any one operation. Other sizes may be employed.

Referring again to FIG. 2, the cache directory memory 111 of FIG. 2 also includes LRU (least recently used) head and LRU tail pointers (not shown) in the LRU queue pointers field 204 (FIG. 2) used to identify LRU queues of resident and non-resident CL records as previously described. The resident and non-resident LRU head and LRU tail pointers are referred to by reference numerals 204a, 204a' and 204b, 204b', respectively, in FIG. 4B. In the exemplary embodiment of FIG. 4B, the resident LRU head pointer 204a leads to CL record 201a (FIG. 4A), which is the most recently used CL record among the resident CL records in the resident LRU queue (in this example). The LRU tail pointer 204a' (FIG. 4B), in turn, leads to CL record 201d (FIG. 4B), which is the least recently used resident CL record (in this example).

Resident and non-resident CL records 201, 202 in the LRU queues are linked together in a doubly-linked list in order from most recently to least recently used. Thus, referring to FIGS. 4A–4B, resident CL record 201a has a pointer in a down pointer field 213a (FIG. 4A) leading to the first least recently used CL record in the LRU queue, which in the illustrated situation is resident CL record 201d (FIG. 4B). The resident CL record 201a also has a pointer in the up pointer field 212a (FIG. 4A) leading to the first most recently used CL record in the LRU queue, which, in this example, has a NIL value because the resident CL record 201a is the most recently used resident CL record. Similarly, the resident CL record 201d has a pointer in its up pointer field 212d (FIG. 4B) leading to the first most recently used resident CL record in the LRU queue, which in this example is the resident CL record 201a. The resident CL record 201d has a pointer in its down pointer field 213d (FIG. 4B) leading to the first least recently used resident CL record in the queue, which in the illustrated situation has a NIL value because the resident CL record 201d is the least recently used resident CL record in the LRU queue.

It should be noted that all resident and non-resident CL records 201, 202 managing data are in either a resident or non-resident LRU queue. Any resident or non-resident CL records 201, 202 which are not in use, are kept in a free list of resident CL records 201 or in a free list of non-resident CL records 202 (e.g., each list being a singly-linked list of respective resident or non-resident CL records 201, 202 that are not currently in use). For purposes of example, it will be assumed that resident CL records 201f, 201g, 201h and 201i; are not in use as shown by the exemplary free list "FL" of FIG. 4A. As illustrated in FIG. 4A, the first CL record 201f of the free list FL is identified by the free list pointers 206 (described previously with reference to FIG. 2). The first CL record 201f in the free list FL includes in its working set pointer stored in the field 209f (as discussed above with reference to FIG. 2) a pointer to the second CL record 201g in the free list FL. Subsequent CL records in the free list FL are similarly linked using working set pointers. The last CL record 201i in the free list has a NIL value in its working set pointer 209i.

FIGS. 5A–5D illustrate four states STATE1–STATE4, respectively, of a page table entry (PTE) array 500 of a resident CL record 201 (FIG. 1) useful in describing a first exemplary update routine in accordance with the present invention. In the particular embodiment described herein, each resident CL record 201 (FIG. 1) includes 36 possible PTE set pointers, where each of the 36 valid PTE set pointers includes 16 PTEs. (The number of valid PTE set pointers may be determined by examining the PTE set count (field 214, FIG. 2).) Each PTE in the PTE array 500 points to a respective page (or resource of 512 bytes of data) in the cache memory 112 (FIG. 1). Other numbers of PTE set pointers, PTEs per set pointer and/or page sizes may be employed.

Data is stored in the cache memory 112 with reference to 4-kbyte blocks of uncompressed data (e.g., 64, 4-kbyte block per 256k data band). In one aspect, 8 PTEs of the PTE array 500 are employed to point to an uncompressed 4-kbyte data block. However, to store more data in the cache memory 112 it may be desirable to compress data prior to writing the data to the cache memory 112. In such instances, fewer than 8 PTEs may be employed to point to compressed data (the compressed data corresponding to a 4 kbyte uncompressed data block). In general, for each 4 kbyte uncompressed data block, the better the compressibility of the data block, the fewer the number of PTEs required to point to the data (once the data is compressed). For example, if a 4 kbyte uncompressed data block is compressed by a factor of two, 4 PTEs (as compared to 8 PTEs) in the PTE array 500 may be used to point to the 2 kbytes of compressed data stored in cache memory 112. Thus, the number of PTEs which point to each respective 4 kbyte uncompressed data block indicates the compression factor for that particular 4 kbyte data block.

Figure 5A:
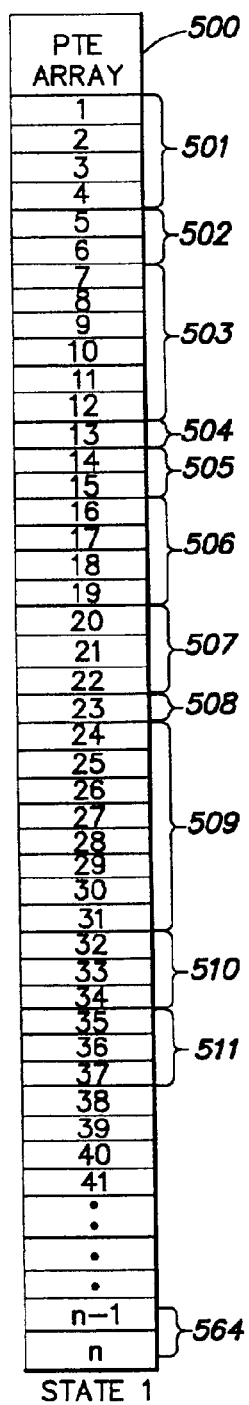
FIGS. 5A–5D illustrate four states of a PTE array of a resident CL record during a first exemplary update routine.

Referring to FIG. 5A, the first state STATE1 of the PTE array 500 shows groupings of PTEs numbered 501–511 prior to execution of the first update routine. Each of the PTE groups 501–511 in the PTE array 500 points to a respective compressed data block stored in the cache memory 112, where each compressed data block corresponds to an uncompressed 4-kbyte block of a 256 kbyte uncompressed data band. Thus, PTE groups 501–511 point to 11 compressed data blocks, which in turn correspond to eleven 4 kbyte blocks of uncompressed data. Specifically, PTEs 1–4 (which constitute PTE group 501) point to 2 kbytes of compressed data stored in the cache memory 112. These 2 kbytes of compressed data correspond to a first 4 kbyte uncompressed data block of a data band (not shown). In addition, PTEs 5–6 (which constitute PTE group 502) in the PTE array 500 point to 1-kbyte of compressed data stored in the cache memory 112. This 1-kbyte of compressed data corresponds to a second 4-kbyte uncompressed data block of the data band.

When an update is made to the cache memory 112, it is generally not efficient to decompress and recompress an entire cache line (e.g., all 256 kbytes of a data band) when the update is only to a section of data for the cache line. The present invention overcomes such inefficiencies by updating only a portion of a cache line/data band during update routines such as the first update routine (e.g., the portion of the cache line/data band in which data is to change) as described below. For example, assume that the first update routine is a routine that updates only the compressed data stored in the cache memory 112 as identified by PTEs in PTE groups 502, 503, 506 and 509. Prior to execution of the first update routine (as illustrated by STATE1, FIG. 5A), PTEs 5–6 (which constitute the PTE group 502) point to 1-kbyte of compressed data stored in the cache memory 112, which in turn corresponds to a 4-kbyte uncompressed data block (as described previously). However, during the first exemplary update routine, assume that (1) the 4-kbyte uncompressed data block pointed to by PTEs 5–6 (PTE group 502) is updated with new data that is less compressible, such that four PTEs are needed to point to the new compressed data, compared to two PTEs for the previously compressed data; (2) the 4-kbyte uncompressed data block pointed to by PTEs 7–12 (PTE group 503) is replaced with new data that is more compressible, such that only three PTEs are needed to point to the new compressed data, compared to six PTEs for the previously compressed data; (3) the 4-kbyte uncompressed data block pointed to by PTEs 16–19 (PTE group 506) is replaced with new data which is less compressible, such that eight PTEs are needed to point to the new compressed data, compared to four PTEs for the previously compressed data; and (4) the 4-kbyte uncompressed data block pointed to by PTEs 24–31 (PTE group 509) is replaced with new data that is more compressible, such that only two PTEs are needed to point to the new compressed data, compared to eight PTEs for the previously compressed data.

In the first update routine set forth above, four 4-kbyte data blocks of a data band (cache line) are affected by the update routine (e.g., the second, third, sixth, and ninth compressed data blocks are replaced with new compressed data). Since the tenth through sixty-fourth data blocks are not updated, the only area within the PTE array 500 affected by the first update routine spans from PTE 5 through PTE 31. In addition, the total number of PTEs corresponding to the four new data blocks is reduced from 20 to 17.

Figure 5B:
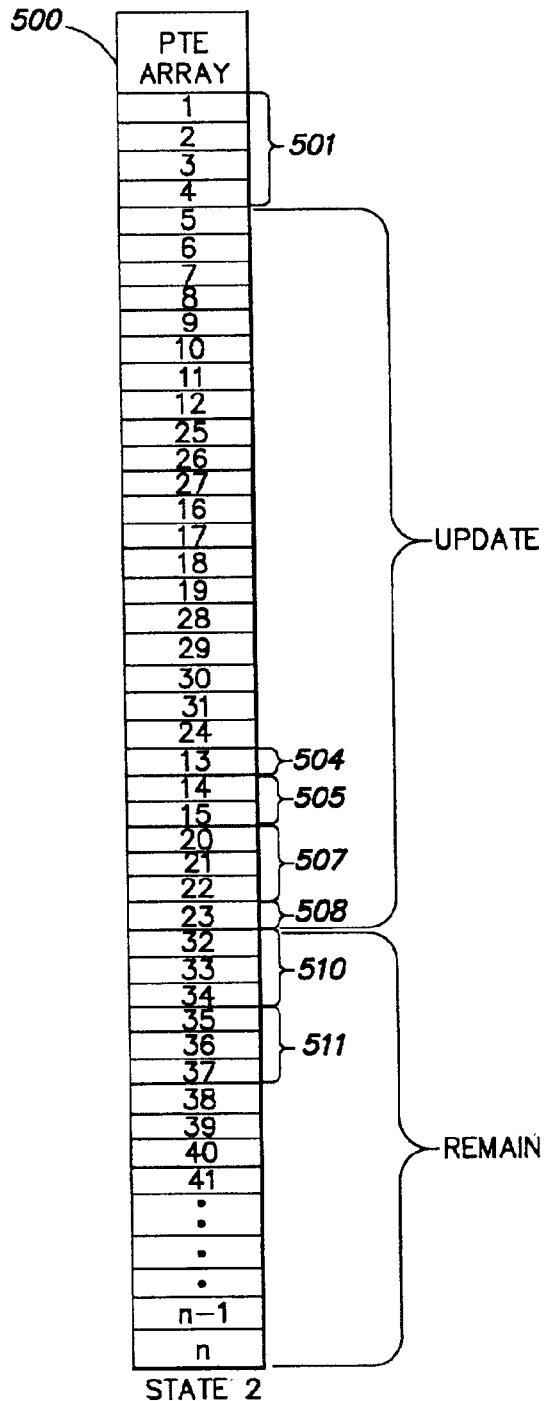

Referring now to the second state STATE2 of the PTE array 500 illustrated in FIG. 5B, since the first data block (pointed to by PTEs 1–4) is not updated during the first update routine, the first four PTEs of the PTE array 500 are not affected by the first update routine and thus, remain unchanged. An update area ("UPDATE") following the unaffected PTEs 1–4 of the PTE array 500 includes the PTEs affected by the first update routine. As indicated above with reference to FIG. 5A, the area of the PTE array 500 affected by the first update routine begins with PTE 5 and continues through PTE 31. Thus, 27 PTEs are within an area of the PTE array 500 that is affected by the first update routine.

The remaining area ("REMAIN") following the update area UPDATE in the second state STATE2 of the PTE array 500 includes all of the remaining PTEs that follow the update area UPDATE through the end of the PTE array 500. The PTEs in the remaining area REMAIN are unchanged by the first update routine, and the compression of the data in the cache memory 112 corresponding to these PTEs remains constant. In this example, the remaining area REMAIN begins with PTE 32 of PTE group 510 and ends with PTE group 564, the last PTE group in the PTE array 500. Typically, fewer than 36 PTE sets are employed.

With reference to the update area UPDATE of the second state STATE2 of the PTE array 500 (FIG. 5B), the PTEs corresponding to unchanged data blocks that happen to be located in the update area UPDATE are moved from their position in the first state STATE1 of the PTE array 500 (FIG. 5A) to the bottom of the update area UPDATE in the second state STATE2 of the PTE array 500 (FIG. 5B). For example, PTEs 13–1 and 20–23 are moved to the end of the update area UPDATE (e.g., the PTE groups 504, 505, 507 and 508 for the unchanged data (the fourth, fifth, seventh, and eighth data blocks) are moved to the end of the update area UPDATE as shown in the second state STATE2 of the PTE array 500). Moving (via swapping) PTEs 13–15 and 20–23 (PTEs corresponding to the unchanged data blocks) to the end of the update area UPDATE, displaces PTEs 25–31. Specifically, in the second state STATE2 of the PTE array 500, the position of PTEs 25–31 (in STATE1) is swapped with the position of PTEs 13–15 and 20–23 (in STATE1) as shown.

As set forth above, during the first update routine the number of PTEs corresponding to the second data block (pointed to by PTE group 502) increased from two to four, the number of PTEs corresponding to the third data block (pointed to by PTE group 503) decreased from six to three, the number of PTEs corresponding to the sixth data block (pointed to by PTE group 506) increased from four to eight, and the number of PTEs corresponding to the ninth data block (pointed to by PTE group 509) decreased from eight to two. Accordingly, three fewer PTEs are required to point to the second, third, sixth and ninth data blocks following the first update routine. Referring to the third state STATE3 of the PTE array 500 (FIG. 5C), the update area UPDATE (FIG. 5B) is shown to have been modified (modified update area UPDATE') to reflect the requirement of three fewer PTEs. Namely, the number of PTEs in the modified update area UPDATE' of the third state 3 STATE3 of the PTE array 500 (FIG. 5C) is reduced to 24 from 27 (the number present in the update area UPDATE of the second state STATE2 of the PTE array 500 (FIG. 5B)).

Between the second and the third states of the PTE array 500, the PTEs within the update area are again swapped. In this manner, in the third state STATE3 of the PTE array 500, the PTEs for the updated data blocks are set aside, effectively creating "holes" within the PTE array 500. In addition, the PTEs for the unchanged data blocks (PTE groups 504, 505, 507 and 508) are returned to their original order in the PTE array 500 (the order occupied in the first state STATE1 of the PTE array 500).

For instance, referring to the third state STATE3 of the PTE array 500, the second PTE group (referred to as second PTE group 502' in STATE3) includes four PTEs (PTEs 5–8) corresponding to the updated "second" data block of the PTE array 500. Thus, PTEs 7–8 have been added to the second PTE group 502'. In addition, the third PTE group (referred to as third PTE group 503' in STATE3) includes three PTEs (PTEs 9–11) corresponding to the updated third data block of the PTE array 500. These two PTE groups 502', 503' immediately follow the first PTE group 501 (PTEs 1–4) corresponding to the first data block of the PTE array 500 which is unchanged by the first update routine. After the third PTE group 503' are PTE groups 504 and 505 corresponding to the fourth and fifth data blocks of the PTE array 500 that were unchanged by the first update routine. These PTE groups 504, 505 are returned to their original (STATE1, FIG. 5A) positions following the third PTE group 503' for the third data block of the PTE array 500.

Similar operations are performed to create holes in the PTE array 500 for the sixth data block of the PTE array 500, which has eight corresponding PTEs as shown by PTE group 506' in the third state STATE3 of the PTE array 500 (FIG. 5C); and the PTE groups 507 and 508 corresponding to seventh and eighth data blocks of the PTE array 500 are returned to their original (STATE1) positions. Finally, another hole in the PTE array 500 is created for the ninth data block (to accommodate PTEs 26 and 31) as shown by PTE group 509.

Figure 5C:
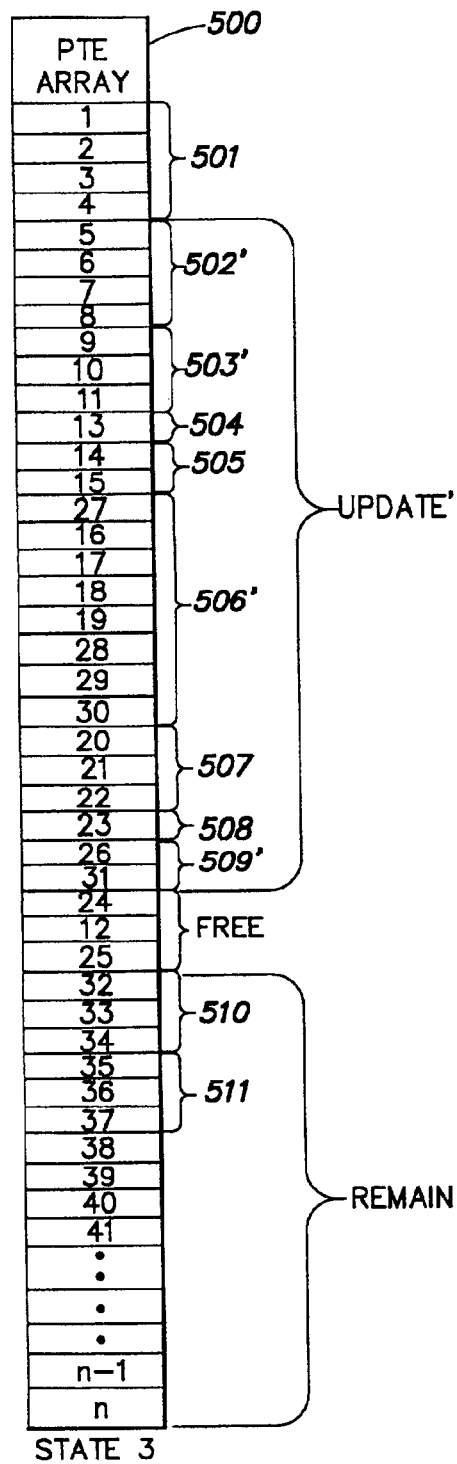

As shown in STATE3 of FIG. 5C, PTEs 24, 12 and 25 are freed (e.g., not needed or used) by the first update routine, and are located in an area of the PTE array 500 termed "FREE". These three PTEs correspond to three available resources in the cache memory 112 (FIG. 1) created during the first update routine.

Figure 5D:
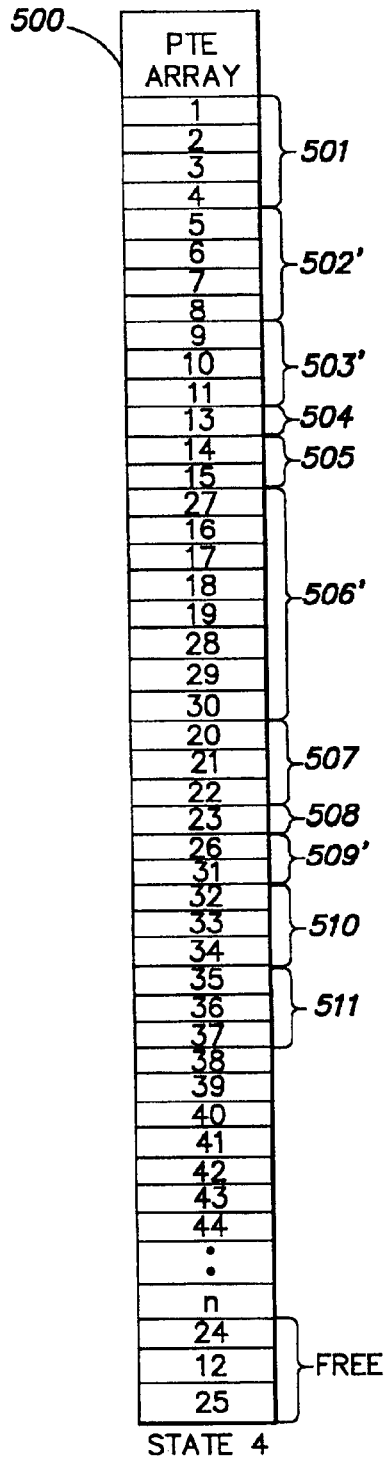

Finally, referring to the fourth state STATE4 of the PTE array 500 shown in FIG. 5D, the PTEs in area FREE (PTEs 24, 12, and 25) are moved to the bottom of the PTE array 500 so that PTEs which point to data blocks in the cache memory 112 (FIG. 1) are located sequentially in the PTE array 500, and the free PTEs are located at the bottom of the PTE array 500.

In the example described above, the first update routine resulted in data compression when compared to the original data. Thus, fewer PTEs were needed for the new compressed data. However, an update routine also may result in less compression when compared to the original data, in which case more PTEs would be required for the new data. Additionally, there may be instances where an update routine does not change the overall number of PTEs required to point to compressed data, but impacts the number of PTEs required by individual data blocks that are updated.

FIGS. 6A–C illustrate three states STATE61, STATE62, STATE63, respectively, of second exemplary PTE array 600 of a resident CL record 201 (FIG. 1) during a second update routine in accordance with the present invention. The first state STATE61 (FIG. 6A) represents the state of the PTE array 600 prior to the second update routine. The second state STATE62 (FIG. 6B) represents the state of the PTE array 600 during the second update routine. The third state STATE63 (FIG. 6C) represents the state of the PTE array 600 after the second update routine.

As shown in FIG. 6A, prior to the second update routine, the PTE array 600 includes seven PTE groups 6X, 6P, 6Q, 6Y, 8A, 8B and 8C. PTE groups 6X, 6P, 6Q, and 6Y each contain 6 PTEs which are not affected by the second update routine. PTE groups 8A, 8B and 8C each contain 8 PTEs which are affected by the second update routine, and are located in an update area UPDATE6 of the PTE array 600.

In the second state STATE62 of the second update routine (FIG. 6B) the groups 6P and 6Q (also located in the update area UPDATE6) are moved to the bottom of the update area UPDATE6. In the third state STATE63 (FIG. 6C), the update area UPDATE6 is modified to reflect the number of PTEs required for the new data pointed to by PTE groups 8A, 8B and 8C (as shown by modified update area UPDATE 6'), which in the present case is only one PTE per PTE group. The requirement of only one PTE per PTE group for original PTE groups 8A, 8B and 8C (FIG. 6A), following the second update routine is indicated by reference numerals 1A, 1B and 1C in FIG. 6C. The groups 6P and 6Q also are returned to their original order in STATE63. The additional 21 free (e.g., unused) PTEs (7 from each of the groups 8A, 8B and 8C) are moved to the bottom of the PTE array 600 (not shown). Thus, as a result of the second update routine fewer PTEs are needed to point to the compressed data stored in the cache memory 112.

Figure 7A:
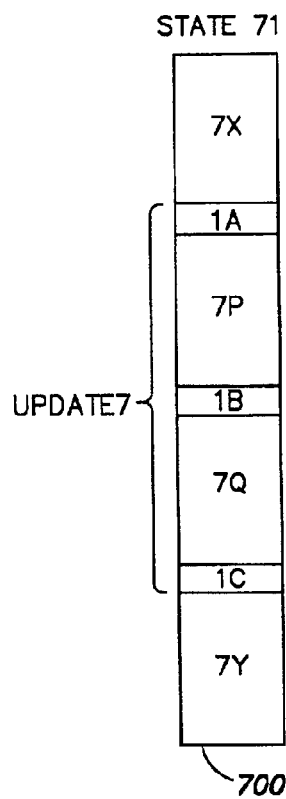
FIGS. 7A–7C illustrate three states of a PTE array of a resident CL record during yet another exemplary update routine in which new data is less compressible than the data it replaces.
Figure 7B:
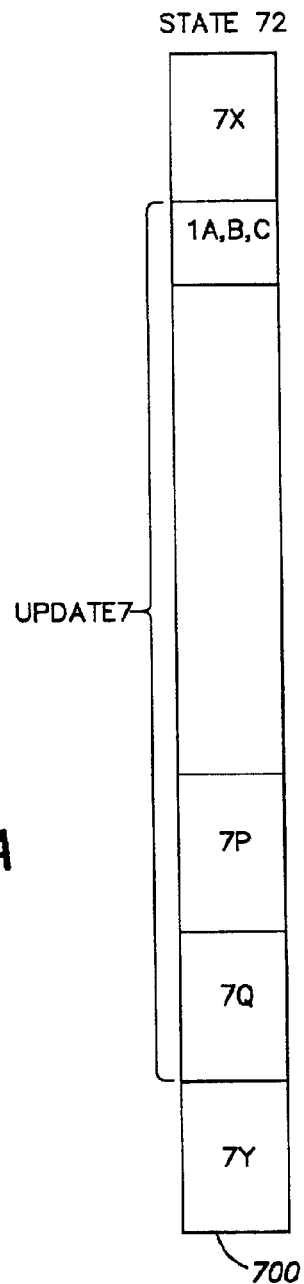
Figure 7C:
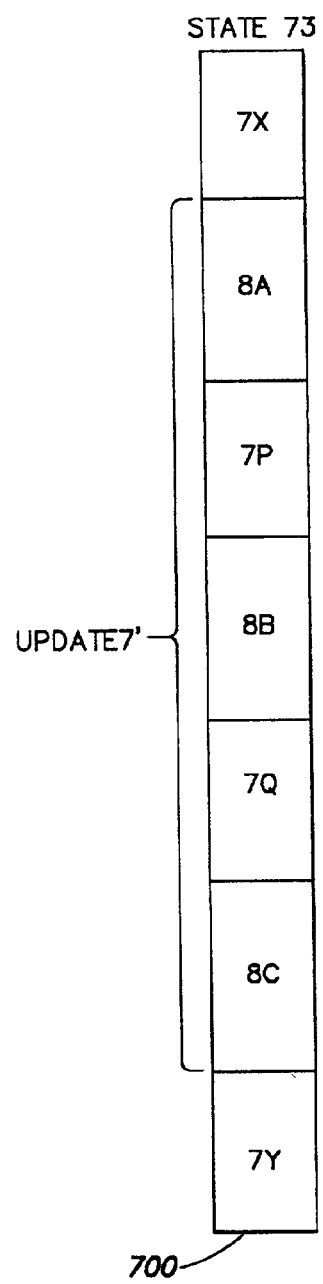

FIGS. 7A–C illustrate three states STATE71, STATE72, STATE73, respectively, of a PTE array 700 of a resident CL record 201 during a third update routine in accordance with the present invention. The first state STATE71 (FIG. 7A) represents the state of the PTE array 700 prior to the third update routine. The second state STATE72 (FIG. 7B) represents the state of the PTE array 700 during the third update routine. The third state STATE73 (FIG. 7C) represents the state of the PTE array 700 after the third update routine. PTE groups 7X, 7P, 7Q, and 7Y include PTEs which are not affected by the third update routine. PTE groups 1A, 1B and 1C (FIG. 7A) includes PTEs that are affected by the third update routine. PTE group 7Y represents the last PTE group in the PTE array 700, and is moved down within the PTE array 700 when free PTEs are added to the PTE array 700.

In the second state STATE72 of the third update routine (FIG. 7B), PTE groups 7P and 7Q (located in an update area UPDATE7 (FIG. 7A) that includes PTE groups 1A, 1B and 1C) are moved to the bottom of the update area UPDATE7. In the third state STATE73 (FIG. 7C), the update area UPDATE7 is modified to reflect the number of PTEs required for the new data pointed to by the PTE groups 1A, 1B and 1C (as shown by modified update area UPDATE 7'), which in the present case is eight PTEs per PTE group. The requirement of eight PTEs per PTE group for original PTE groups 1A, 1B and 1C (FIG. 7A) following the third update routine is indicated by reference numerals 8A, 8B and 8C in FIG. 7C. The PTE groups 7P and 7Q also are returned to their original in order STATE73. Thus, as a result of the third update routine, data compression is reduced such that more PTEs are needed to point to the new data stored in the cache memory 112. Techniques for obtaining the additional PTEs are described below.

Figure 8A:
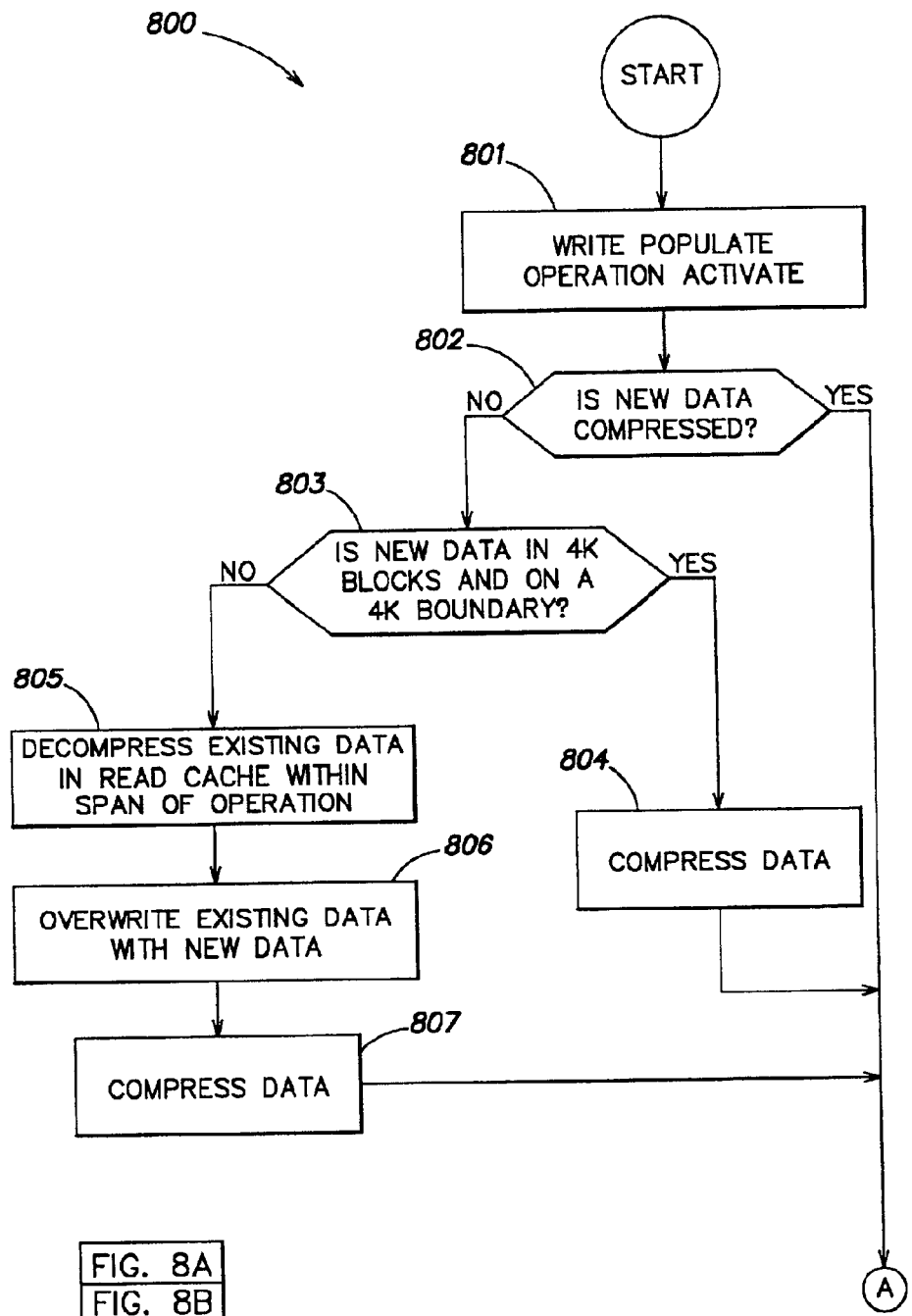
FIGS. 8A–8C are a flowchart illustrating an exemplary compressed read cache update routine in accordance with one embodiment of the present invention.
Figure 8B:
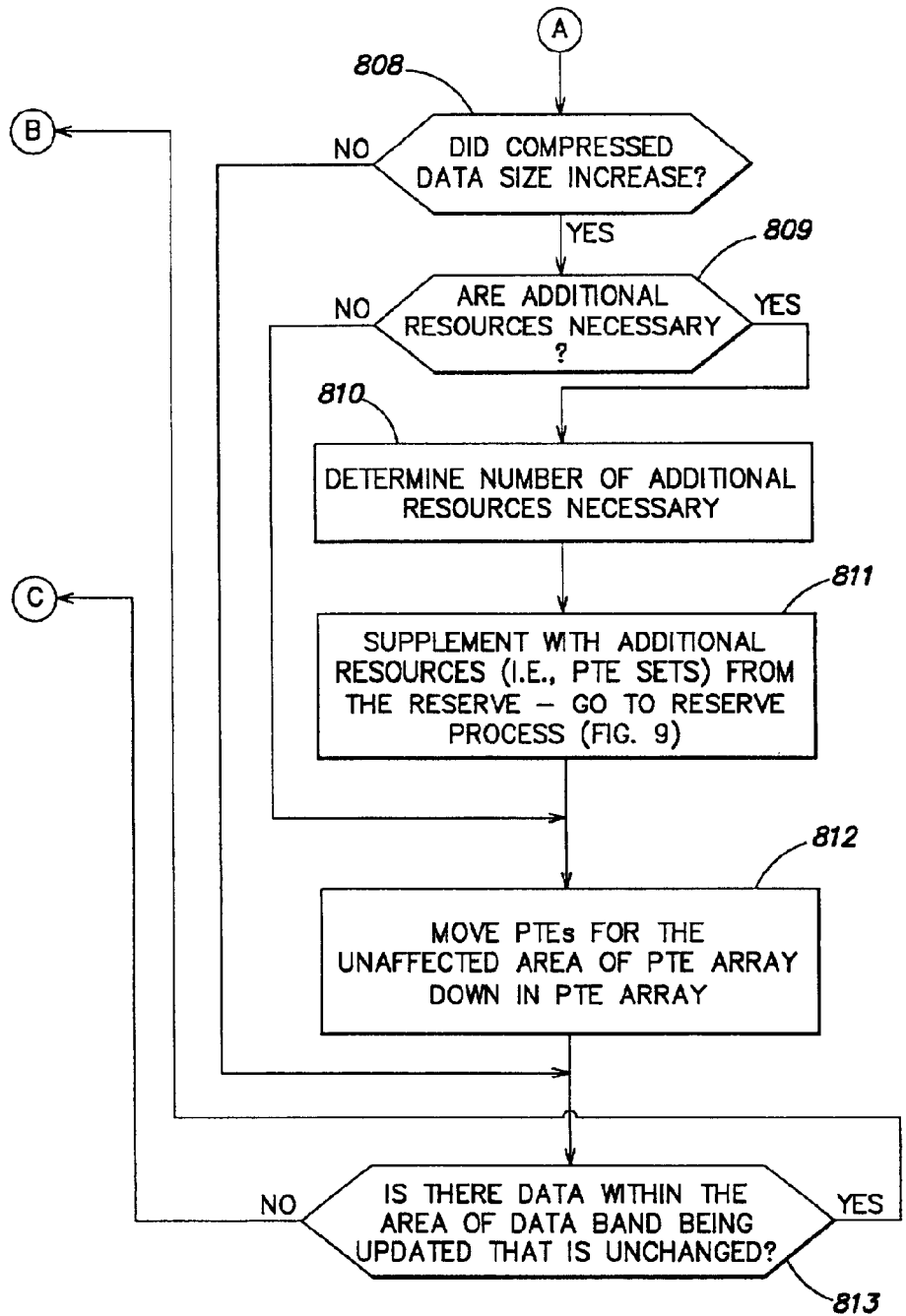
Figure 8C:
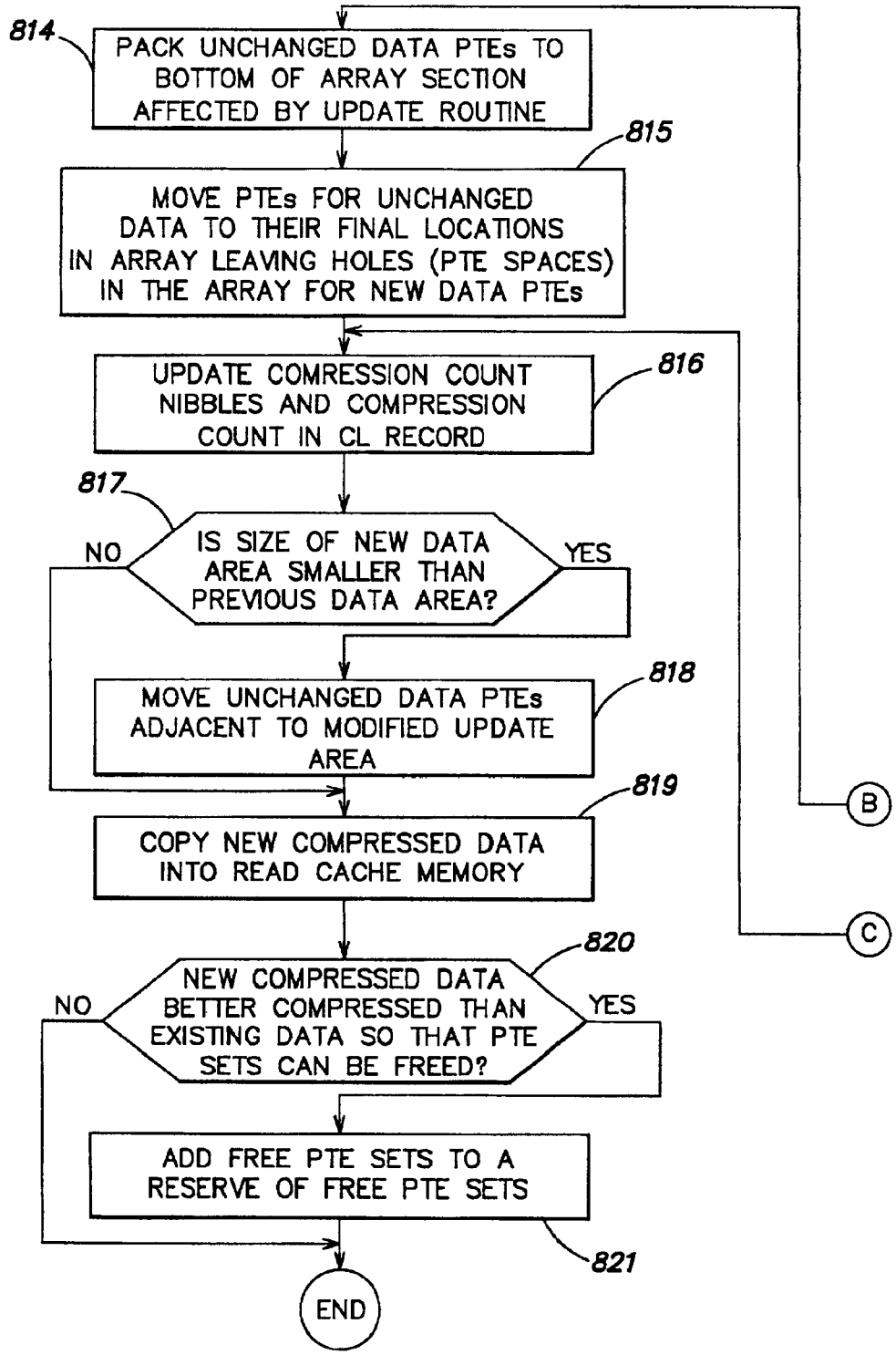

FIGS. 8A–8C are a flowchart illustrating an exemplary compressed read cache update routine (process 800) in accordance with one embodiment of the present invention. With reference to FIG. 8A, in response to an instruction to perform a write populate operation, at step 801, a write populate operation is activated by the controller 110 (FIG. 1) in the auxiliary storage interface 105 (FIG. 1). The instruction to perform the write populate operation includes an update routine for replacing a section (e.g., one or more data blocks) of a resident CL record 201 (FIG. 2) with new data. In accordance with the present invention, the compression of the remaining data in the resident CL record (e.g., the data in the other data blocks) remains unchanged or constant during the update routine. The update routine may be the result of either a destage procedure of a write cache or a write operation into a read cache. The new data replacing the section of the resident CL record 201 during the update routine may include, for example, compressed or uncompressed data from a write cache (not shown), or may include uncompressed data from the main memory 103 (FIG. 1), access to which is controlled by the CPU 101 (FIG. 1). Such uncompressed data from main memory 103 is compressed or uncompressed before replacing the existing data in the cache memory 112 (e.g., via the compression/decompression unit 114 of FIG. 1).

Referring to FIGS. 8A–8C, at step 802 the controller 110 determines whether the new data for the write populate operation is compressed. If at step 802 it is determined that the new data is not compressed, then the new data is compressed via steps 803–807; otherwise the process 800 proceeds to step 808.

Assuming the new data is not compressed, at step 803 the controller 110 determines whether the new data is in 4 kbyte data blocks and also, whether the new data is on a 4 kbyte boundary. As stated previously, each data band of the cache memory 112 comprises 256 kbytes organized in 64, 4 kbyte data blocks. Each 4-kbyte data block is subdivided into 8 sectors, and each sector represents 512 bytes of data. The first 4-kbyte data block of each data band includes sectors 1–8, the second 4-kbyte data block of each data band includes sectors 9–16, the third 4-kbyte data block of each data band includes sectors 17–24, the fourth 4-kbyte data block includes sectors 25–32, etc. With regard to step 803 of FIGS. 8A–8C, if the new data is on a 4-kbyte boundary, then the write operation begins with a first sector of a 4-kbyte data block and ends on a last sector of a 4-kbyte data block. For example, assume the write operation is to a logical block address 9 (which corresponds to sector 9 of the second 4-kbyte data block of a data band) and includes enough data to occupy 16 sectors (e.g., 8-kbytes of uncompressed data that will occupy sectors from 9 through 24). In such an example, the write operation begins on a 4 kbyte boundary (e.g., sector 9) and ends on a 4 kbyte boundary (e.g., sector 24). Thus, in this example the controller 110 would determine in step 803 that the new data is on a 4-kbyte boundary. However, consider the example of a write operation to a logical block address 26 (which corresponds to sector 26 of the fourth 4 kbyte data bock, even though the fourth 4-kbyte data block starts with sector 25) for 21 sectors such that the write operation begins with sector 26 and ends with sector 46 (a sector of the sixth 4-kbyte block data block). In this example, the write operation does not begin on a 4 kbyte boundary (the write operation begins with the 2$^{nd}$ sector of the fourth 4 kbyte data block of the respective data band), nor does it end on a 4 kbyte boundary (the write operation ends with the 7$^{th}$ sector of the sixth 4 kbyte data block of the data band). Thus, it would be determined in step 803 that the new data is not on a 4-kbyte boundary.

If the controller 110 determines that the new data is in 4 kbyte blocks as well as on a 4-kbyte boundary, then at step 804 the data is compressed by the compression/decompression unit 114 (FIG. 1). Any suitable compression algorithm may be employed (e.g., Lempel-Ziv 1 or other similar algorithms). However, if at step 803 it is determined that the new data is either not in 4 kbyte blocks, or not on a 4-kbyte boundary, then at step 805, the 4 kbyte data blocks of the respective data band, which includes the existing data to be replaced, are decompressed by the compression/decompression unit 114 (FIG. 1). At step 806, the decompressed, existing data in the respective data band is overwritten with the new data, and at step 807 the data in the data band is compressed. For example, assume the write operation is to a logical block address 26 (which corresponds to sector 26) for 21 sectors. The write operation thus begins with sector 26 and ends with sector 46, neither of which are on a 4-kbyte boundary (as previously described). In such a scenario, at step 805 the 4-kbyte data blocks of the respective data band, including sectors 26–46, are decompressed. At step 806, the decompressed data in the cache memory 112 is overwritten with the new data (e.g., the PTEs for logical block addresses 26–46, corresponding to sectors 26–46, are replaced with PTEs referencing the new data). Then, at step 807, the updated data in the data band is compressed by the compression/decompression unit 114 (FIG. 1).

Once compressed data is available, at step 808 the controller 110 determines whether the size of the new compressed data has increased. Specifically, a compression factor of the new compressed data (e.g., the number of PTEs required to point to the new data) is compared with a compression factor of the data that will be replaced in the resident CL record 201 (e.g., the number of PTEs that is required to point to the current data). For example, during the third update routine of FIGS. 7A–7C, only one PTE was required to point to each of the second, fourth and sixth data blocks of the PTE array 700 prior to the third update routine. However, after the third update routine, 8 PTEs were required to point to each of the second, fourth and sixth data blocks of the PTE array 700.

Since more PTEs are needed for the new compressed data, in step 808 of FIGS. 8A–8C, it would be determined that the compressed data size has increased.

If the controller 110 determines at step 808 that the size of the new compressed data has increased, then at step 809 the controller 110 determines whether additional resources of the cache memory 112 are required to accommodate the new compressed data. Additional resources are required when the number of additional PTEs required to point to the new data being added to a data band exceeds the number of free PTEs of the resident CL record 201 in question. For example, in the third update routine of FIGS. 7A–7C, 21 additional PTEs are required to point to the new data of the second, fourth and sixth data blocks. Such a large number of additional PTEs may exceed the number of free PTEs of a resident CL record and additional PTE sets may be required.

If at step 809 the controller 110 determines that additional resources of the cache memory 112 are necessary, then steps 810–811 follow; otherwise step 812 follows. At step 810, the controller 110 determines the number of additional resources required to accommodate the new compressed data. This determination is based on the number of additional PTEs required to point to the new compressed data. At step 811, a reserve process (described below with reference to FIG. 9) is employed to supplement the resources of the respective resident CL record with the additional resources (PTEs) needed to accommodate the new compressed data.

At step 812, PTEs corresponding to data blocks that are not to be updated (and that are not located within an area of the PTE array having PTEs corresponding to data blocks that are to be updated (e.g., the UPDATE area of FIG. 5B, FIG. 6A or FIG. 7A)), are moved down in the PTE array (e.g., to accommodate additional PTEs within the area of the PTE array containing PTEs corresponding to data blocks that are to be updated). For example, with regard to the third update routine of FIGS. 7A–C, the PTEs in group 7Y (which includes PTEs corresponding to data blocks and are not to be updated) are moved down in the PTE array 700 to accommodate PTEs corresponding to new compressed data.

Referring again to FIGS. 8A–8C, following step 812, or if the controller 110 determines that the size of the new compressed data did not increase (step 808), at step 813 the controller 110 determines whether there is data within the area of the data band being updated that is not to be updated during the update routine (e.g., whether there are PTEs corresponding to data blocks that are not to be updated located within an area of the PTE array having PTEs corresponding to data blocks that are to be updated (e.g., the UPDATE area of FIG. 5B, FIG. 6A or FIG. 7A)). For example, as described with reference to FIGS. 6A–C, the PTEs in groups 6P and 6Q correspond to data that is not changed during the second update routine; and PTEs in these groups are located within the update area UPDATE6.

If there is data within the area of the data band being updated that is not to be updated, then at step 814, the PTEs for the unchanged data blocks are moved down in the PTE array below the PTEs for the data blocks affected by the update routine. For example, referring to the second state STATE62 of the PTE array 600 (FIG. 6B) PTEs in groups 6P and 6Q are moved to the bottom of the update area UPDATE62. Similarly, PTEs in groups 7P and 7Q are moved to the bottom of the update area UPDATE72 as illustrated in the second state STATE72 of the PTE array 700 (FIG. 7B).

Thereafter at step 815, the PTEs for the unchanged data are moved to their final locations, leaving "holes" (available PTE spaces) in the PTE array for the PTEs corresponding to the new compressed data. For example, referring to FIG. 6C, PTEs in groups 6P and 6Q are moved to their final locations in the PTE array 600 in the third state STATE63. Similarly, referring to FIG. 7C, PTEs in groups 7P and 7Q are moved to their final locations in the PTE array 700 in the third state STATE73.

If at step 813 the controller 110 determines that there is no unchanged data within the area of the data band being updated, or after moving PTEs for unchanged data to their final locations in step 815, the process 800 proceeds to step 816. At step 816, the compression count nibbles and the compression count (the sum of the 64 compression count nibbles) in the resident CL record 201 are updated as previously described.

At step 817, the controller 110 determines whether the size of the modified update area (UPDATE', UPDATE6' or UPDATE7' in FIGS. 5C, 6C and 7C, respectively) corresponding to the new compressed data is smaller than the update area (UPDATE, UPDATE6, UPDATE7 in FIGS. 5B, 6C and 7C respectively) corresponding to the original data. If so, the process 800 proceeds with step 818; otherwise the process 800 proceeds with step 819. For example, in the PTE array 600 of FIGS. 6A–C, the modified update area UPDATE6' (FIG. 6C) corresponding to the compressed new data, is smaller than the update area UPDATE6 (FIG. 6B) corresponding to the original data.

At step 818, the PTEs corresponding to the unchanged data are moved up within the PTE array to be adjacent to the PTEs corresponding to the new compressed data. For example, referring again to the third state STATE63 of the PTE array 600 (FIG. 6C), the PTEs in group 6Y corresponding to unchanged data are moved up with the PTE array 600 to be adjacent to the PTEs in the modified update area UPDATE6'.

At step 819, the new compressed data is copied into the available resources of the cache memory 112 (e.g., by passing the data through a conventional DMA engine). In this manner, the old existing data is replaced with the new compressed data.

At step 820 the controller 110 determines whether the new compressed data has been compressed more than the old (existing) data that the new compressed data replaced (e.g., to determine if additional resources in the cache memory 112 have been made available). If the new compressed data has been "better" compressed, fewer PTEs are needed for the new compressed data than for the data replaced by the new compressed data, thus possibly freeing PTE sets. (Recall that in the embodiment of FIG. 2, a PTE array includes up to 36 valid PTE set pointers, where each of the 36 PTE set pointers includes 16 PTEs. Thus, a PTE set references 16 PTEs.) Referring to FIGS. 6A–C, it can be seen that the new compressed data compressed better than the data it replaced, such that 22 fewer PTEs are needed for the new compressed data. If only 16 PTEs are needed for a PTE set, 16 of the 22 PTEs can be freed and made available for storing compressed data. (In the embodiment described herein, PTE sets rather than individual PTEs are freed. It will be understood that individual PTEs also may be freed).

If at step 820 the controller 110 determines that additional PTE sets have been made available, then at step 821 the available PTE sets are added to a reserve of free PTE sets (as described below) and the process 800 ends; otherwise, following step 820, the process 800 ends.

The reserve of free PTE sets corresponds to available resources in the cache memory 112 (FIG. 1) for storing compressed data. In the preferred embodiment of the present invention discussed herein, the PTEs of the free PTE sets, each of which is an index or pointer to a respective free resource in the cache memory 112, are maintained in the reserve. As a result, the resources in the cache memory 112 do not move, but rather, the references to data (i.e., PTES) move. However, it will be appreciated by one of ordinary skill in the art that in an alternate embodiment resources rather than pointers to resources (PTEs) may be maintained in a reserve. In addition, it will be appreciated by one of ordinary skill in the art that individual PTEs rather than PTE sets may be freed and/or maintained in the reserve.

FIG. 9 is a flowchart illustrating an exemplary reserve process 900 of the compressed read cache update routine (process 800) of FIGS. 8A–C in accordance with one embodiment of the present invention. The reserve process 900 may be employed by the controller 110 (FIG. 1) during the update routine set forth in FIGS. 8A–C, at step 811, to allocate the additional cache resources (as required). The reserve process 900 operates similarly to a penny cup employed at a cash register (e.g., extra pennies may be stored in the penny cup, and pennies may be taken out of the penny cup as required). In the reserve process 900 of FIG. 9, free PTE sets are maintained in a reserve. If only a few PTE sets are needed during an update, the few PTE sets may be taken from the reserve. However, if too many PTE sets are needed, a request for the PTE sets may be denied. As previously explained in conjunction with steps 820–821 of FIGS. 8A–C, PTE sets in a resident CL record 201 become free when new data is compressed more than the data it replaces. Thus, when PTE sets become free they are added to the reserve (step 821). Such a reserve process permits a relatively even give and take of PTE sets. As indicated above, the PTE sets, rather than PTEs or cache resources, are maintained in the reserve.

Referring again to FIG. 9, the reserve process 900 begins, at step 901, when the controller 110 receives a request for additional PTE sets (e.g., via step 811 of the update process 800 of FIGS. 8A–8C). At step 902 the controller 110 determines whether the request is for an entire cache line (e.g., 36 PTE sets), indicating a request to bring new data into the cache memory 112 (FIG. 1). If the request is for 36 PTE sets, then at step 903, the controller 110 determines whether the number of free PTE sets in the reserve exceeds a predetermined threshold (the "reserve threshold"). In one exemplary embodiment, if the number of free PTE sets is above the reserve threshold, the requests for PTE sets and for bringing new data into the cache memory 112 are granted at step 904, and the process 900 returns to step 811 of process 800 (FIGS. 8A–8C) in step 905. However, if the number of free PTE sets is at or below the reserve threshold, in step 906 the request for the PTE sets is denied, and an error condition is returned to the process 800 at step 811. In this manner, the predetermined threshold serves to limit requests for PTE sets.

The predetermined (reserve) threshold should be set to a value that can absorb the normal expansion and contraction of data during operations performed on the cache memory 112. Typically, the predetermined (reserve) threshold is set sufficiently high to allow for a reasonable number of resident CL records within the cache memory 112, but not so high that the resident CL records sit idle and unused. In one embodiment, the predetermined threshold for the reserve process 900 is 144 PTE sets. Other values may be employed.

Referring again to step 902, if the request for additional PTE sets is not for an entire cache line (e.g., if the request is for less than 36 PTE sets), then at step 907 the controller 110 determines whether the number of PTE sets requested is available in the reserve. If the requested number of PTE sets is available, then the request for PTE sets is granted at step 904, and at step 905 the reserve process 900 returns to the set 811 of the update routine 800 (FIGS. 8A–8C) as previously described. However, if the requested number of PTE sets is not available, the process 900 proceeds to step 908 wherein a pillage process (described below with reference to FIGS. 10A–10B is performed until the number of requested PTE sets is made available. Once the number of requested PTE sets becomes available, the process 900 proceeds to step 904 wherein the request for PTE sets is granted. In step 905, the process 900 returns to step 811 of update routine 800 as previously described.

During normal operation with a fairly stable compression ratio, updates to a resident CL record 201 will either not change the number of PTE sets needed for the resident CL record 201 or will require only a small number of PTE sets to be added to, or freed from, the resident CL record 201. Since the reserve process 900 of FIG. 9 accommodates requests for additional PTE sets, continuous updates to the cache memory 112 may be performed without needing to remove a resident CL record 201 from the cache memory 112 due to a lack of PTE sets. If the compression ratio of incoming data improves or if a resident CL record 201 is removed from the cache memory 112 because its statistics deteriorate, the number of free PTE sets may rise above the predetermined (reserve) threshold (for adding a new cache line), permitting new data to be brought into the cache memory 112 in the form of an additional cache line. If the compression ratio of incoming data worsens, the PTE sets in the reserve will be consumed and will need to be replenished.

To replenish the PTE set reserve when the reserve does not contain enough PTE sets to satisfy a request for an update, a pillage process is invoked. FIGS. 10A–10B are a flowchart illustrating an exemplary pillage process 1000 (of the reserve process 900 of FIG. 9) in accordance with one embodiment of the present invention. To replenish the reserve, the pillage process 1000 removes resident CL records 201 from the cache directory memory 111, thus freeing PTE sets attached to the removed resident CL records 201 which frees a portion of the cache memory 112. The pillage process calculates a "figure of merit" (FOM) for a resident CL record 201 to determine whether it should be thrown out or retained. The FOM is a number that indicates the relative worth of a resident CL record 201. In one embodiment, the FOM is computed for a resident CL record 201 based on statistics of the data in the resident CL record 201 and the compressibility of the data stored therein (e.g., how many PTEs would be freed by removing the data in the resident CL record 201).

Referring to FIGS. 10A–10B, the pillage process 1000 begins at step 1001, wherein the resident least recently used (LRU) queue of the cache directory memory 111 (e.g., located via LRU queue pointers 204 (FIG. 2)) is searched. As explained with reference to FIGS. 2 and 4A–4B, the resident LRU queue is used to index all of the resident CL records 201 representing data in cache memory 112. Searching of the resident LRU queue begins with the least recently used (LRU) resident CL record 201. At step 1002, the controller 110 determines whether the LRU resident CL record 201 is in an idle state. This determination is made by referring to the state information field 208 (FIG. 2) of the LRU resident CL record 201, as described previously with reference to FIG. 2.

If the LRU resident CL record 201 is not in an idle state, then the next resident CL record 201 in the resident queue (e.g., the next resident CL record 201 up from the least recently used (LRU) resident CL record 201, toward the most recently used (MRU) resident CL record 201) is searched at step 1003, and the process 1000 returns to step 1002 to determine whether the searched resident CL record 201 is in an idle state. Steps 1002 and 1003 repeat until a resident CL record 201 is found that is in an idle state. Recall that when a resident CL record 201 is not in an idle state, it is likely in use (e.g., during a read or populate process). Thus, to avoid freeing resources that are in use, resident CL records 201 that are in use are skipped and the next least recently used resident CL record 201 of the resident queue is examined.

If a resident CL record 201 is found to be in an idle state at step 1002, then at step 1004 a count for the number of located idle resident CL records 201 is incremented. Based on this count, at step 1005, the controller 110 determines whether a maximum number of idle resident CL records 201 has been searched. In one embodiment, the maximum number of idle resident CL records to be searched is set at 12, although other numbers may be employed. If the maximum number of idle resident CL records 201 has not been searched, then at step 1006, a Figure of Merit (FOM) for the current resident CL record 201 is examined. As stated, the FOM may be based on, for example, data statistics and/or compressibility for the resident CL record 201. If the FOM is less than a predetermined value, the resident CL record 201 is removed from the resident LRU queue and from the hash table 203 and is added to the resident free list (pointed to by free list pointers 206 in FIG. 2); otherwise the resident CL record 201 is retained. In the exemplary embodiment discussed herein, the higher the FOM, the more worthwhile the data in the cache memory 112. In one embodiment, the FOM of a resident CL record 201 is based on the number of PTE sets of the resident CL record 201 and the statistics for the resident CL record 201. As stated previously, the statistics for a resident CL record 201 may be based on the count of a statistics counter that is increased in value when a read operation is made to a data band being managed by the resident CL record 201 and that is decreased in value when a write operation is made to the data band. As an example of a FOM calculation, the statistics for a resident CL record 201 may be assumed to depend linearly on the number of PTE sets employed by the resident CL 201, so as to satisfy the formula y=mx+b, where:

m=slope=1;

x=the number of PTE sets (PTE sets) of the resident CL record minus 4 (as a minimum of 4 PTE sets is required to point to 64, 4 kbyte data blocks);

y=the statistics (STATS) for the resident CL record 201; and b=the STATS required to achieve a desired compressibility (e.g., 32 in this example, which leads to a compressibility of 2.67 times).

Setting the above equation to zero:

0=y−mx−b

0=STATS−(PTE sets−4)−32

0=STATS−28−PTE sets

Setting the FOM to zero, the FOM for a resident CL record 201 becomes:

FOM=STATS−28−PTE sets

Other FOMs may be employed, and may be based on one or more other factors/formula.

Referring again to FIG. 10A, if the FOM indicates that the resident CL record 201 should not be removed from the resident LRU queue, then the process 1000 returns to step 1003 to search the next resident CL record 201; otherwise the process 1000 proceeds to step 1007.

At step 1007 the PTE sets in the current resident CL record 201 are freed to be made available for an update routine. Thus, the PTEs are "pillaged" from the resident CL record 201. The resident CL record 201 is taken out of the resident LRU queue and the hash table 203 and is placed in the resident free list queue referenced by the free list pointers 206 of the cache directory memory 111 (FIG. 2).

At step 1008 the controller 110 determines whether a sufficient number of PTE sets have been made available to satisfy the requirements of a PTE request (e.g., to satisfy step 908 of the reserve process 900 of FIG. 9). If a sufficient number of PTE sets have been made available, then at step 1009 the process 1000 returns to the reserve process 900 (step 904) of FIG. 9. In this manner, the resident queue is searched only until enough resident CL records 201 have been freed to release the requested number of PTE sets. If a sufficient number of PTE sets have not been made available, the pillage process 1000 returns to step 1003 to search the next CL record of the resident queue as previously described.

Referring again to step 1005, if the controller 110 determines that the maximum number of idle resident CL records 201 have been searched, then at step 1010, the least recently used (LRU) resident CL record 201 of the resident queue is searched again. During this search, the only requirement is that the resident CL record be idle (e.g., its FOM is not calculated). At step 1011, the controller 110 determines whether the current resident CL record 201 (the LRU resident CL record 201) is in an idle state. If not, then at step 1012 the next resident CL record 201 in the resident queue (up from the least recently used (LRU) and toward the most recently used (MRU) resident CL record 201) is searched. The process 1000 then returns to step 1011 to determine whether the searched resident CL record 201 is in an idle state. Steps 1011 and 1012 are repeated until an idle resident CL record is found.

If the current resident CL record is found to be in an idle state at step 1011, the pillage process 1000 proceeds to steps 1013–1015 which are similar to steps 1007–1009. Namely, at step 1013 the PTE sets in the current resident CL record 201 are freed to be made available for an update routine. Thus, the PTEs are "pillaged" from the resident CL record 201. The resident CL record 201 is taken out of the resident LRU queue and the hash table 203 and is placed in the resident free list queue referenced by the free list pointers 206 of the cache directory memory 111 (FIG. 2). At step 1014 the controller 110 determines whether a sufficient number of PTE sets have been made available to satisfy the requirements of a PTE request (e.g., to satisfy step 908 of the reserve process 900 of FIG. 9). If a sufficient number of PTE sets have been made available, then at step 1015 the process 1000 returns to the reserve process 900 (step 904) of FIG. 9. If a sufficient number of PTE sets have not been made available, the pillage process 1000 returns to step 1012 to search the next CL record of the resident queue as previously described.

In accordance with the various embodiments of the present invention described above, when updates are made to a compressed read cache memory 112 (FIG. 1), it is possible to update a section of a resident CL record 201 without having to decompress and re-compress the entire resident CL record 201. A significant improvement in data storage efficiency is thereby realized.

The processes of FIGS. 8A–10B may be implemented in hardware, software or a combination thereof. In a software embodiment of the invention, the processes of FIGS. 8A–10B may comprise one or more computer program products. Each inventive computer program product may be carried by a medium readable by a computer (e.g., a carrier wave signal, a floppy disk, a hard drive, a random access memory, etc.).

Accordingly, the foregoing description discloses only exemplary embodiments of the invention. Modifications of the above disclosed apparatus and method which fall within the scope of the invention will be readily apparent to those of ordinary skill in the art. It should be understood that other embodiments may fall within the spirit and scope of the invention, as defined by the following claims.

What is claimed is:

1. A method of updating a compressed cache comprising the steps of:

initiating an update routine for replacing first data stored within the cache with second data, wherein a first section of a compressed data band stored in the cache includes the first data and a second section of the compressed data band includes third data; and in response to initiating the update routine, replacing the first data within the compressed data band with the second data without decompressing the third data.

2. The method of claim 1, wherein the update routine includes one of a destage operation and a write operation.

3. The method of claim 1, wherein the step of replacing comprises:

determining whether the second data is compressed; and compressing the second data if the second data is uncompressed.

4. The method of claim 1, wherein the step of replacing comprises:
  determining whether the second data is compressed;
  comparing a first compression factor of the first data with a second compression factor of the second data if the second data is compressed; and
  determining, based on the comparison step, whether one or more resources in the compressed cache utilized by the first data are sufficient to accommodate the second data.

5. The method of claim 4 further comprising the step of:
  supplementing the one or more resources utilized by the first data with a number of additional resources so as to accommodate the second data if the one or more resources utilized by the first data are insufficient to accommodate the second data.

6. The method of claim 5 wherein the step of supplementing comprises the steps of:
  receiving a request for a number of additional resources sufficient to accommodate the second data when combined with the one or more resources utilized by the first data;
  determining whether a reserve of available resources has the number of additional resources; and
  allocating the number of additional resources from the reserve of available resources if the reserve of available resources has the number of additional resources.

7. The method of claim 5 wherein the step of supplementing comprises the steps of:
  receiving a request for a number of additional resources sufficient to accommodate the second data when combined with the one or more resources utilized by the first data;
  determining whether the number of additional resources is greater than a predetermined number of resources, and if so:
    determining whether a number of available resources in a reserve of available resources exceeds a predetermined threshold; and
    granting the request for the number of additional resources if the number of available resources in the reserve of available resources exceeds the predetermined threshold.

8. The method of claim 5 wherein the step of supplementing comprises the steps of:
  determining whether a reserve of available resources has a number of additional resources sufficient to accommodate the second data when combined with the one or more resources utilized by the first data; and
  performing a pillage process if the reserve of available resources has an insufficient number of additional resources to accommodate the second data when combined with the one or more resources utilized by the first data.

9. The method of claim 8 wherein the step of performing the pillage process comprises the steps of:
  identifying a cache line record of the compressed cache that is in an idle state;
  calculating a figure of merit for the identified cache line record;
  adding any cache resources associated with the cache line record to the reserve of available resources if the figure of merit is less than a predetermined value; and
  if the reserve of available resources has a number of additional resources sufficient to accommodate the second data when combined with the one or more resources utilized by the first data, supplementing the one or more resources utilized by the first data with the available resources in the reserve to accommodate the second data.

10. The method of claim 9 wherein the cache line record includes a plurality of page table entry set pointers, each page table entry set pointer pointing to a predetermined number of page table entries, wherein each of the cache resources is separately addressable by a respective page table entry.

11. The method of claim 4 further comprising the step of:
  replacing the first data in the compressed cache with the second data if the one or more resources are sufficient to accommodate the second data.

12. The method of claim 11 further comprising the steps of:
  determining, after the replacing step, whether at least one of the one or more resources utilized by the first data has become available; and
  allocating the at least one of the one or more resources into a reserve of available resources if the at least one of the one or more resources has become available.

13. The method of claim 4 wherein each of the one or more resources utilized by the first data is individually addressable by a corresponding page table entry.

14. A method of updating a compressed cache, comprising the steps of:
  initiating an update routine for replacing first data stored within the cache with second data, wherein a first section of a compressed data band stored in the cache includes the first data and a second section of the compressed data band includes third data; and
  in response to initiating the update routine:
    supplementing one or more resources utilized by the first data with a number of additional resources so as to accommodate the second data if the one or more resources utilized by the first data are insufficient to accommodate the second data; and
    replacing the first data within the compressed data band with the second data without decompressing the third data.

15. The method of claim 14 wherein the step of supplementing comprises the steps of:
  receiving a request for a number of additional resources sufficient to accommodate the second data when combined with the one or more resources utilized by the first data;
  determining whether a reserve of available resources has the number of additional resources; and
  allocating the number of additional resources from the reserve of available resources if the reserve of available resources has the number of additional resources.

16. The method of claim 14 wherein the step of supplementing comprises the steps of:
  receiving a request for a number of additional resources sufficient to accommodate the second data when combined with the one or more resources utilized by the first data; and
  determining whether the number of additional resources is greater than a predetermined number of resources, and if so:
    determining whether a number of available resources in a reserve of available resources exceeds a predetermined threshold; and granting the request for the number of additional resources if the number of available resources in the reserve of available resources exceeds the predetermined threshold.

17. The method of claim 14 wherein the step of supplementing comprises the steps of:
   determining whether a reserve of available resources has a number of additional resources sufficient to accommodate the second data when combined with the one or more resources utilized by the first data; and
   performing a pillage process if the reserve of available resources has an insufficient number of additional resources to accommodate the second data when combined with the one or more resources utilized by the first data.

18. The method of claim 17 wherein the step of performing the pillage process comprises the steps of:
   identifying a cache line record of the compressed cache that is in an idle state;
   calculating a figure of merit for the identified cache line record;
   adding any cache resources associated with the cache line record to the reserve of available resources if the figure of merit is less than a predetermined value; and
   if the reserve of available resources has a number of additional resources sufficient to accommodate the second data when combined with the one or more resources utilized by the first data, supplementing the one or more resources utilized by the first data with the available resources in the reserve to accommodate the second data.

19. The method of claim 18 wherein the cache line record includes a plurality of page table entry set pointers, each page table entry set pointer pointing to a predetermined number of page table entries, wherein each of the cache resources is separately addressable by a respective page table entry.

20. A compressed read cache system, comprising:
   a compressed read cache configured to store data; and
   a controller operatively coupled to the cache and configured to:
      initiate an update routine for replacing first data stored within the cache with second data, wherein a first section of a compressed data band stored in the cache includes the first data and a second section of the compressed data band includes third data; and
      in response to initiating the update routine, replace the first data within the compressed data band with the second data without decompressing the third data.

21. The system of claim 20, wherein the controller is further configured to:
   determine whether the second data is compressed;
   compare a first compression factor of the first data with a second compression factor of the second data if the second data is compressed; and
   determine, based on the comparison of the first and second compression factors, whether one or more resources in the cache utilized by the first data are sufficient to accommodate the second data.

22. The system of claim 21 further including a compression unit operatively coupled to said controller, said compression unit configured to compress the second data if the controller determines that the second data is uncompressed.

23. The system of claim 21, wherein the controller is further configured to supplement the one or more resources utilized by the first data with a number of additional resources so as to accommodate the second data if the one or more resources utilized by the first data are insufficient to accommodate the second data.

24. The system of claim 23 wherein the controller is further configured to:
   receive a request for a number of additional resources sufficient to accommodate the second data when combined with the one or more resources utilized by the first data;
   determine whether a reserve of available resources has the number of additional resources; and
   allocate the number of additional resources from the reserve of available resources if the reserve of available resources has the number of additional resources.

25. The system of claim 23 wherein the controller is further configured to:
   receive a request for a number of additional resources sufficient to accommodate the second data when combined with the one or more resources utilized by the first data;
   determine whether the number of additional resources is greater than a predetermined number of resources, and if so:
      determine whether a number of available resources in a reserve of available resources exceeds a predetermined threshold; and
      grant the request for the number of additional resources if the number of available resources in the reserve of available resources exceeds the predetermined threshold.

26. The system of claim 23 wherein the controller is further configured to:
   determine whether a reserve of available resources has a number of additional resources sufficient to accommodate the second data when combined with the one or more resources utilized by the first data; and
   perform a pillage process if the reserve of available resources has an insufficient number of additional resources to accommodate the second data when combined with the one or more resources utilized by the first data.

27. The system of claim 26 wherein when the controller performs the pillage process, the controller is further configured to:
   identify a cache line record of the compressed cache that is in an idle state;
   calculate a figure of merit for the identified cache line record;
   add any cache resources associated with the cache line record to the reserve of available resources if the figure of merit is less than a predetermined value; and
   if the reserve of available resources has a number of additional resources sufficient to accommodate the second data when combined with the one or more resources utilized by the first data, supplement the one or more resources utilized by the first data with the available resources in the reserve to accommodate the second data.

28. The system of claim 27 wherein the cache line record includes a plurality of page table entry set pointers, each page table entry set pointer pointing to a predetermined number of page table entries, wherein each of the cache resources is separately addressable by a respective page table entry.

29. The system of claim 21, wherein the controller is further configured to replace the first data in the cache with the second data if the one or more resources are sufficient to accommodate the second data.

30. The system of claim 29, wherein the controller is further configured to:
   determine, after replacing the first data, whether at least one of the one or more resources utilized by the first data has become available; and
   allocate the at least one of the one or more resources into a reserve of available resources if the at least one of the one or more resources has become available.

31. The method of claim 21 wherein each of the one or more resources is individually addressable by a corresponding page table entry.

32. A compressed read cache system, comprising:
   a compressed read cache configured to store data; and
   a controller operatively coupled to the cache, and configured to:
      initiate an update routine for replacing first data stored within the cache with second data, wherein a first section of a compressed data band stored in the cache includes the first data and a second section of the compressed data band includes third data; and
      in response to initiating the update routine:
         supplement one or more resources utilized by the first data with a number of additional resources so as to accommodate the second data if the one or more resources utilized by the first data are insufficient to accommodate the second data; and
         replace the first data within the compressed data band with the second data without decompressing the third data.

33. A computer program product for use with a compressed read cache, comprising:
   a medium readable by a computer, the computer readable medium having computer program code adapted to:
      initiate an update routine for replacing first data stored within the cache with second data, wherein a first section of a compressed data band stored in the cache includes the first data and a second section of the compressed data band includes third data; and
      in response to initiating the update routine, replace the first data within the compressed data band with the second data without decompressing the third data.

34. A computer program product for use with a compressed read cache, comprising:
   a medium readable by a computer, the computer readable medium having computer program code adapted to:
      initiate an update routine for replacing first data stored within the cache with second data, wherein a first section of a compressed data band stored in the cache includes the first data and a second section of the compressed data band includes third data; and
      in response to initiating the update routine:
         supplement one or more resources utilized by the first data with a number of additional resources so as to accommodate the second data if the one or more resources utilized by the first data are insufficient to accommodate the second data; and
         replace the first data within the compressed data band with the second data without decompressing the third data.

* * * * *